US012122039B2

(12) United States Patent
Mizukami et al.

(10) Patent No.: US 12,122,039 B2
(45) Date of Patent: Oct. 22, 2024

(54) INFORMATION PROCESSING DEVICE AND INFORMATION PROCESSING METHOD

(71) Applicant: SONY CORPORATION, Tokyo (JP)

(72) Inventors: Tomoo Mizukami, Tokyo (JP); Kei Yoshinaka, Tokyo (JP); Naoki Yuasa, Chiba (JP); Izumi Kawanishi, Tokyo (JP); Hiroto Watanabe, Tokyo (JP); Junichirou Sakata, Tokyo (JP); Tohru Kurata, Tokyo (JP); Yuichiro Tou, Tokyo (JP)

(73) Assignee: SONY CORPORATION, Tokyo (JP)

( * ) Notice: Subject to any disclaimer, the term of this patent is extended or adjusted under 35 U.S.C. 154(b) by 112 days.

(21) Appl. No.: 16/769,989

(22) PCT Filed: Sep. 18, 2018

(86) PCT No.: PCT/JP2018/034482
§ 371 (c)(1),
(2) Date: Jun. 4, 2020

(87) PCT Pub. No.: WO2019/123744
PCT Pub. Date: Jun. 27, 2019

(65) Prior Publication Data
US 2021/0197393 A1    Jul. 1, 2021

(30) Foreign Application Priority Data
Dec. 22, 2017  (JP) ................................ 2017-246738

(51) Int. Cl.
*B25J 11/00* (2006.01)
*A63H 3/36* (2006.01)
*G06F 3/04842* (2022.01)

(52) U.S. Cl.
CPC ............ *B25J 11/001* (2013.01); *A63H 3/365* (2013.01); *G06F 3/04842* (2013.01); *A63H 2200/00* (2013.01)

(58) Field of Classification Search
CPC ... A63H 3/365; A63H 2200/00; B25J 11/001; G06F 3/04842
See application file for complete search history.

(56) References Cited

U.S. PATENT DOCUMENTS 6,249,780 B1 * 6/2001 Mizokawa ........... G05B 19/042
706/11
6,560,511 B1 * 5/2003 Yokoo .................... A63H 11/00
700/245

(Continued)

FOREIGN PATENT DOCUMENTS

CN        1313781 A     9/2001
CN      104066484 A     9/2014
(Continued)

OTHER PUBLICATIONS

International Search Report and Written Opinion of PCT Application No. PCT/JP2018/034482, issued on Dec. 18, 2018, 10 pages of ISRWO.

*Primary Examiner* — Jeremy L Stanley
(74) *Attorney, Agent, or Firm* — CHIP LAW GROUP

(57) ABSTRACT

Provided is an information processing device to activate communication between an autonomous operation body and a user. The information processing device includes an application control unit that controls operation of an application relating to communication between an autonomous operation body and a user and a reflection unit that causes the autonomous operation body to reflect an operation performed by the user in the application. In the information processing device, the application control unit controls operation of an avatar imitating the autonomous operation (Continued)

body, and the reflection unit causes the autonomous operation body to reflect a reward obtained by the avatar on the basis of the operation performed by the user.

18 Claims, 30 Drawing Sheets

(56) References Cited

U.S. PATENT DOCUMENTS

| | | | | |
|---|---|---|---|---|
| 2002/0138175 A1* | 9/2002 | Fujita | ................... | G06N 3/008 |
| | | | | 700/245 |
| 2002/0138822 A1* | 9/2002 | Noma | ................... | G06F 11/00 |
| | | | | 717/131 |
| 2003/0060937 A1* | 3/2003 | Shinada | ............. | G01C 21/3641 |
| | | | | 701/1 |
| 2003/0191560 A1* | 10/2003 | Yokoo | ................... | G06N 3/006 |
| | | | | 700/245 |
| 2004/0038739 A1* | 2/2004 | Wanat | ................... | A63F 13/77 |
| | | | | 463/36 |
| 2006/0146017 A1* | 7/2006 | Leung | ................... | G06F 1/1626 |
| | | | | 345/156 |
| 2006/0176182 A1* | 8/2006 | Noguchi | ................... | B25J 13/08 |
| | | | | 340/573.1 |
| 2007/0178980 A1* | 8/2007 | Hardin | ................... | A63H 33/42 |
| | | | | 434/428 |
| 2007/0183381 A1* | 8/2007 | Seo | ................... | H04M 1/72427 |
| | | | | 370/338 |
| 2009/0055019 A1* | 2/2009 | Stiehl | ................... | B25J 9/1656 |
| | | | | 700/249 |
| 2009/0137185 A1* | 5/2009 | Zheng | ................... | A63H 3/28 |
| | | | | 446/268 |
| 2012/0190453 A1* | 7/2012 | Skaff | ................... | A63H 3/28 |
| | | | | 463/41 |
| 2012/0315821 A1* | 12/2012 | Hayakawa | ................ | A63H 3/28 |
| | | | | 446/297 |
| 2013/0260346 A1* | 10/2013 | Wood | ................... | G09B 5/06 |
| | | | | 434/156 |
| 2014/0206444 A1* | 7/2014 | Lin | ................... | A63F 13/825 |
| | | | | 463/31 |
| 2015/0111640 A1* | 4/2015 | Zheng | ................... | A63H 33/26 |
| | | | | 463/29 |
| 2015/0360366 A1* | 12/2015 | Gupta | ................... | B25J 13/06 |
| | | | | 434/118 |
| 2016/0114253 A1* | 4/2016 | Zheng | ................... | A63H 11/00 |
| | | | | 446/175 |
| 2016/0144283 A1* | 5/2016 | Martin | ................... | A63F 13/825 |
| | | | | 463/29 |
| 2016/0151909 A1* | 6/2016 | Hardouin | ................... | B25J 9/08 |
| | | | | 700/245 |
| 2016/0225182 A1* | 8/2016 | Bosscher | ................ | B25J 13/006 |
| 2017/0365277 A1* | 12/2017 | Park | ................... | G10L 15/1815 |
| 2018/0165518 A1* | 6/2018 | Assaf | ................ | G06K 9/00671 |
| 2019/0094981 A1* | 3/2019 | Bradski | ................ | G02B 27/0093 |
| 2019/0111563 A1* | 4/2019 | Stein | ................... | B25J 11/001 |
| 2019/0369641 A1* | 12/2019 | Gillett | ................... | B25J 9/1664 |
| 2021/0001223 A1* | 1/2021 | Zhang | ................... | A63F 13/73 |

FOREIGN PATENT DOCUMENTS

| | | | |
|---|---|---|---|
| CN | 104737209 A | 6/2015 | |
| CN | 105144248 A | 12/2015 | |
| EP | 1092458 A1 | 4/2001 | |
| EP | 2529817 A1 | 12/2012 | |
| JP | 2001-310283 A | 11/2001 | |
| JP | 2002-219677 A | 8/2002 | |
| JP | 2010-064154 A | 3/2010 | |
| JP | 2011-172901 A | 9/2011 | |
| WO | 2000/066239 A1 | 11/2000 | |
| WO | 2001/058649 A1 | 8/2001 | |
| WO | 2011/093525 A1 | 8/2011 | |

* cited by examiner

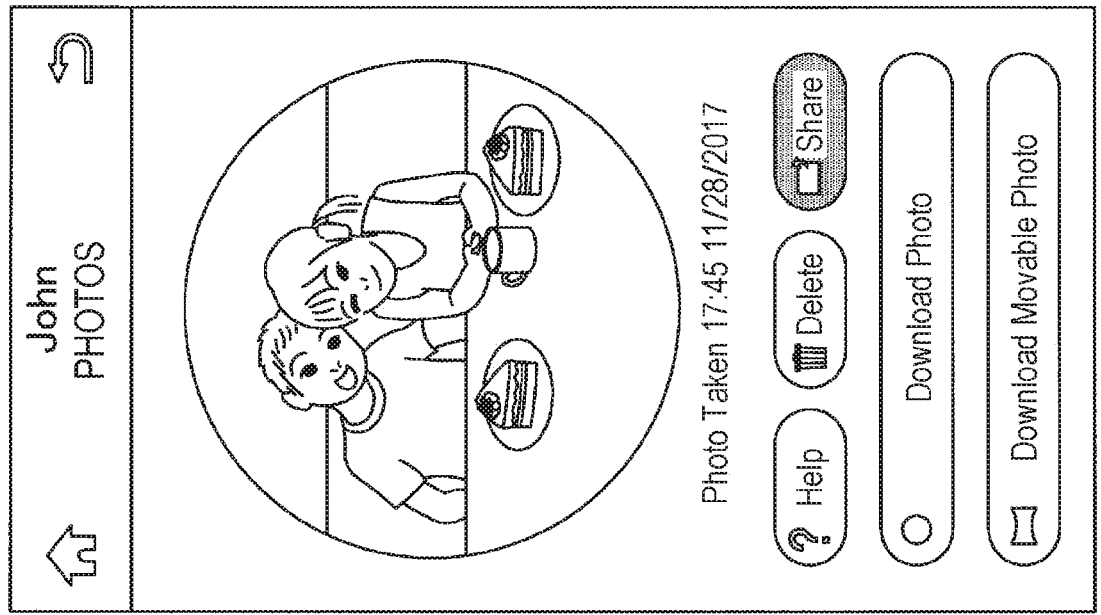
FIG. 21
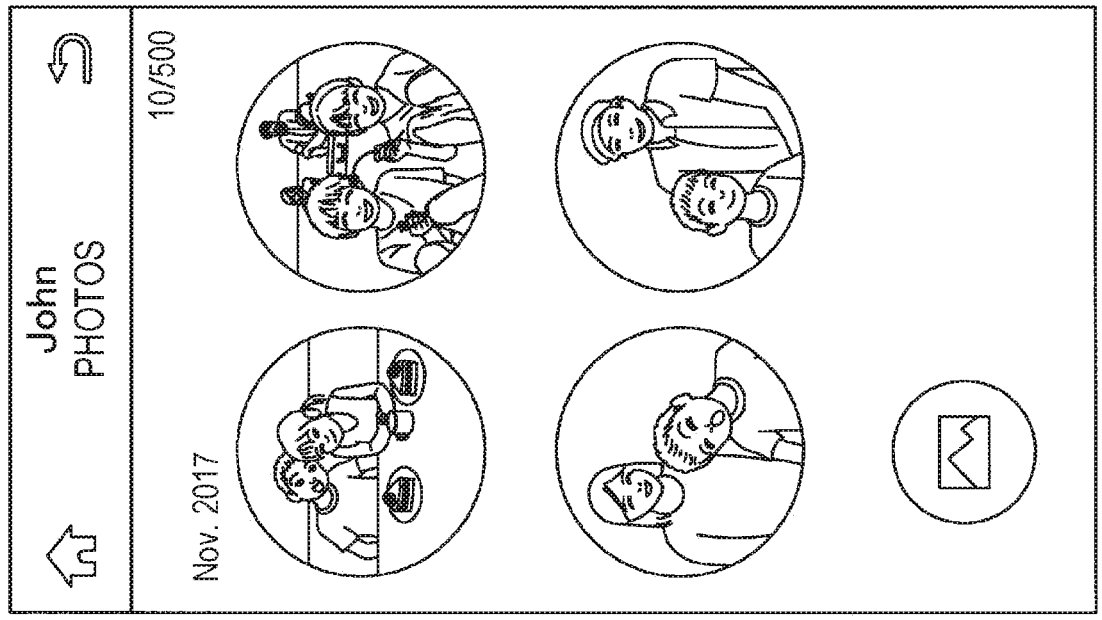

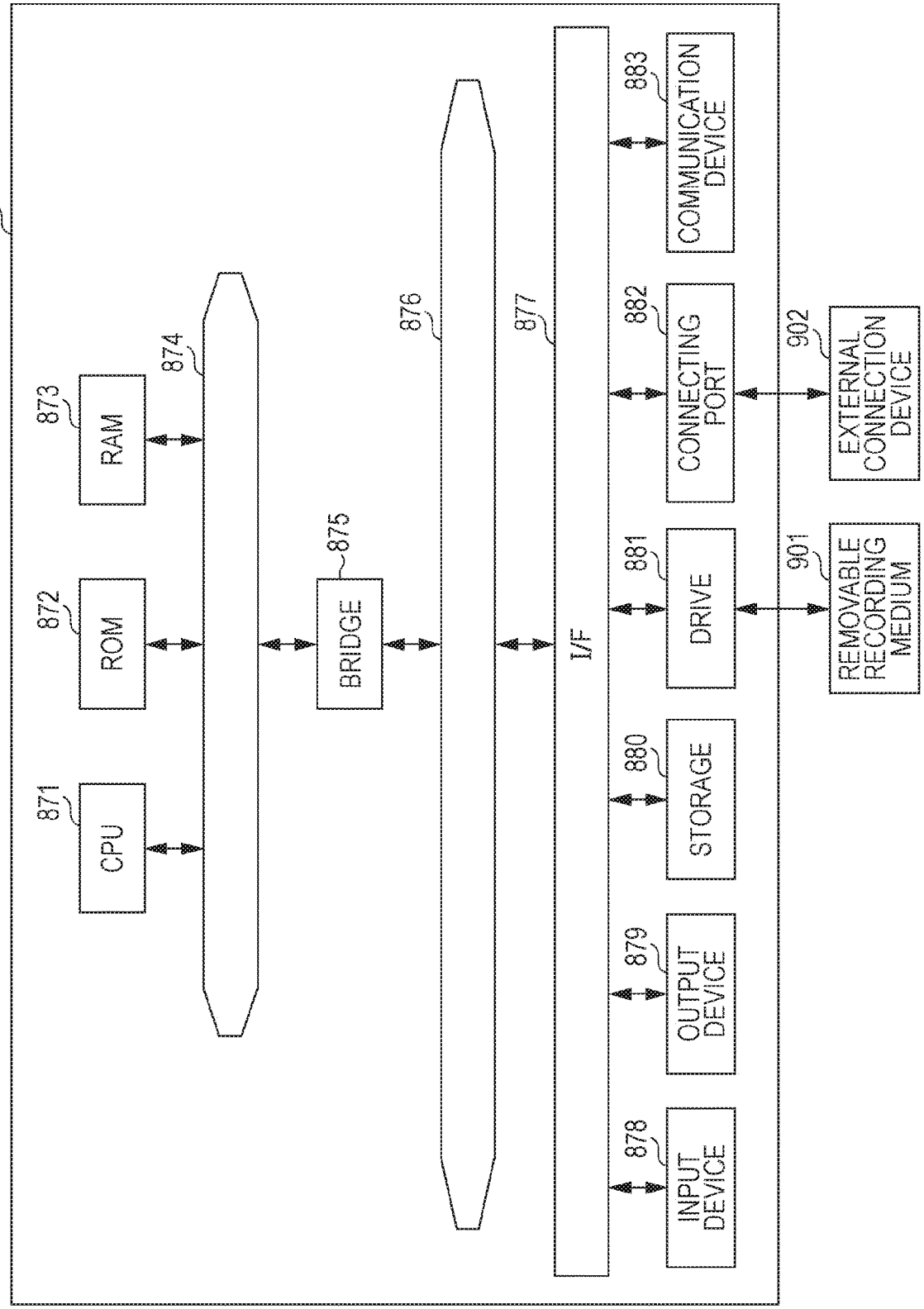

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/034482 filed on Sep. 18, 2018, which claims priority benefit of Japanese Patent Application No. JP 2017-246738 filed in the Japan Patent Office on Dec. 22, 2017. Each of the above-referenced applications is hereby incorporated herein by reference in its entirety.

TECHNICAL FIELD

The present disclosure relates to an information processing device, an information processing method, and a program.

BACKGROUND ART

Various devices with learning functions have been developed in recent years. Such devices include autonomous operation bodies such as a robot that performs an autonomous operation on the basis of an estimated situation. For example, Patent Document 1 discloses a robotics device that performs an information acquiring behavior as one behavior in an autonomous operation.

CITATION LIST

Patent Document

Patent Document 1: Japanese Patent Application Laid-Open No. 2002-219677

SUMMARY OF THE INVENTION

Problems to be Solved by the Invention

Meanwhile, an autonomous operation body like the one described in Patent Document 1 can perform various autonomous behaviors even when the user is absent. However, if the situation in which the autonomous operation body and the user can communicate with each other is limited to cases where the two share the same physical space, the communication becomes intermittent, and the user might not be able to fully enjoy the advantage of owning the autonomous operation body.

Therefore, the present disclosure suggests a novel and improved information processing device, an information processing method, and a program that can further activate communication between an autonomous operation body and a user.

Solutions to Problems

The present disclosure is to provide an information processing device that includes: an application control unit that controls operation of an application relating to communication between an autonomous operation body and a user; and a reflection unit that causes the autonomous operation body to reflect an operation performed by the user in the application. In the information processing device, the application control unit controls operation of an avatar imitating the autonomous operation body, and the reflection unit causes the autonomous operation body to reflect a reward obtained by the avatar on the basis of the operation performed by the user.

The present disclosure is also to provide an information processing method implemented by a processor, the information processing method including: controlling operation of an application relating to communication between an autonomous operation body and a user; and causing the autonomous operation body to reflect an operation performed by the user in the application. In the information processing method, the controlling further includes controlling operation of an avatar imitating the autonomous operation body, and the causing further includes causing the autonomous operation body to reflect a reward obtained by the avatar on the basis of the operation performed by the user.

The present disclosure is also to provide a program for causing a computer to function as an information processing device that includes: an application control unit that controls operation of an application relating to communication between an autonomous operation body and a user; and a reflection unit that causes the autonomous operation body to reflect an operation performed by the user in the application. The application control unit controls operation of an avatar imitating the autonomous operation body, and the reflection unit causes the autonomous operation body to reflect a reward obtained by the avatar on the basis of the operation performed by the user.

Effects of the Invention

As described above, according to the present disclosure, communication between an autonomous operation body and a user can be made more active.

Note that the effect described above is not necessarily restrictive, and it is possible to achieve any one of the effects described in this specification together with the effect described above or instead of the effect described above, or it is possible to achieve other effects obvious from this specification.

BRIEF DESCRIPTION OF DRAWINGS

FIG. 21 is an example of a photo content screen according to the embodiment.

FIG. 30 is a diagram showing an example hardware configuration according to an embodiment of the present disclosure.

MODES FOR CARRYING OUT THE INVENTION

Figure 1:
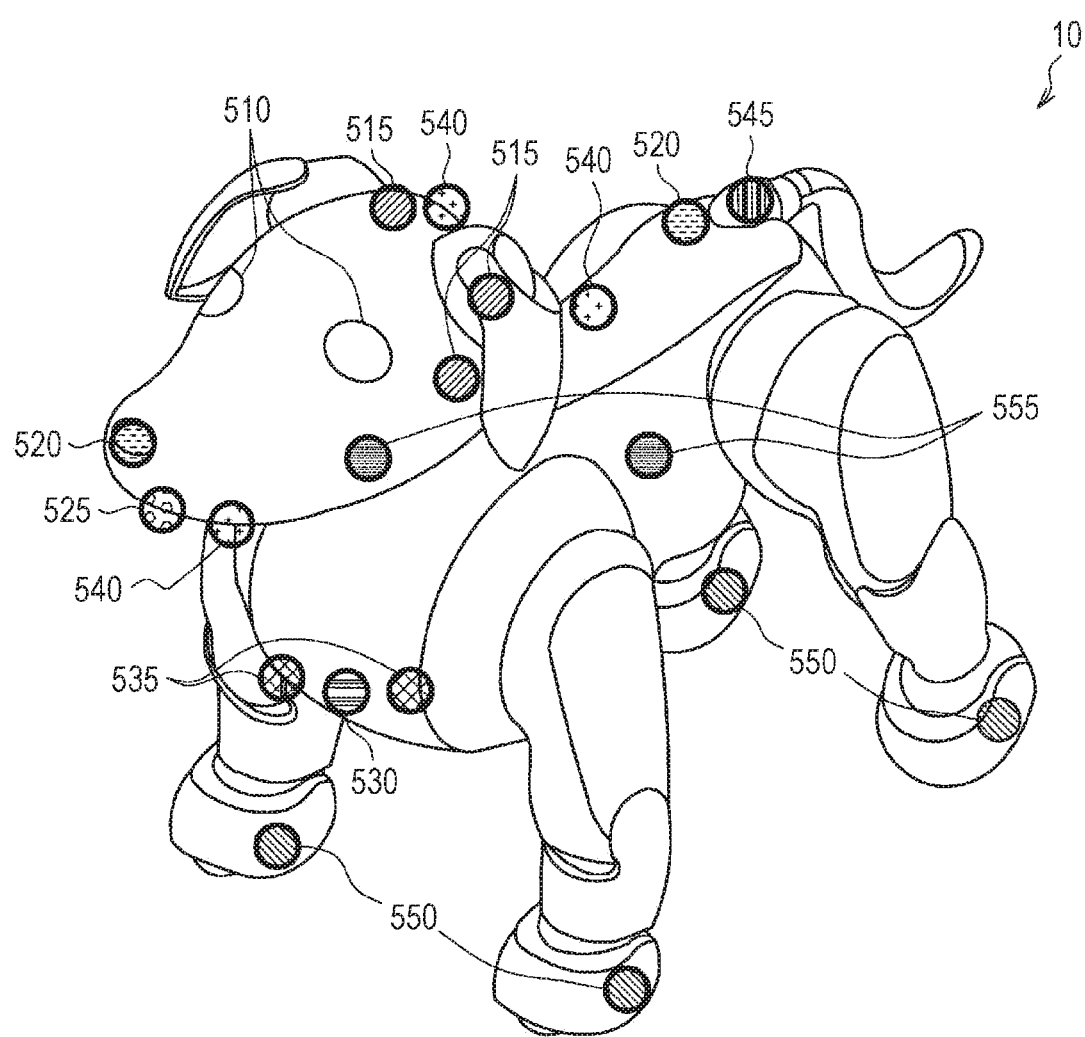
FIG. 1 is a diagram showing an example hardware configuration of an autonomous operation body according to an embodiment of the present disclosure.

The following is a detailed description of preferred embodiments of the present disclosure, with reference to the accompanying drawings. Note that, in this specification and the drawings, components having substantially the same functional configurations are denoted by the same reference numerals, and explanation of them will not be repeated.

Note that explanation will be made in the following order.
1. Configuration
1.1. Overview of an autonomous operation body 10
1.2. Example hardware configuration of an autonomous operation body 10
1.3. Example system configuration
1.4. Example functional configuration of an autonomous operation body 10
1.5. Example functional configuration of an information processing server 20
1.6. Example functional configuration of an information processing terminal 30
2. First embodiment
2.1. Overview
2.2. Details of an application
2.3. Control flow
3. Example hardware configuration
4. Summary

1. Configuration

1.1. Overview of an Autonomous Operation Body 10

First, an overview of an autonomous operation body 10 according to an embodiment of the present disclosure is described. The autonomous operation body 10 according to an embodiment of the present disclosure is an information processing device that estimates situations on the basis of collected sensor information, and autonomously selects and performs various operations depending on the situations. Unlike a robot that performs operations simply in accordance with instruction commands from a user, the autonomous operation body 10 autonomously performs operations estimated to be optimal in the respective situations.

For this reason, the autonomous operation body 10 according to an embodiment of the present disclosure does not perform an operation corresponding to a user's instruction, or performs a different behavior from the operation in some cases, depending on the situation. The above situation corresponds to, for example, a case where an operation corresponding to the user's instruction is performed, a case where the safety of the user or the autonomous operation body 10 or the ambient environment is impaired, a case where the autonomous operation body 10 puts priority on some other desire (instinct) such as a charging process, or the like.

Further, there are cases where the autonomous operation body 10 does not follow the user's instruction on purpose to attract the user's attention or to inform the user of its own emotion or the state of the hardware.

On the other hand, the autonomous operation body 10 has a strong desire (instinct) to be loved by the user. For this reason, the autonomous operation body 10 repeatedly performs the operation corresponding to the user's instruction to please the user, or learns the operation the user likes and spontaneously performs the operation even in a case where there is no instruction.

As described above, the autonomous operation body 10 according to an embodiment of the present disclosure comprehensively judges its desire and emotion, or the ambient environment or the like, and determines and performs an autonomous operation, like animals including humans. In the above aspect, the autonomous operation body 10 is clearly different from a passive device that performs the corresponding operation in accordance with an instruction.

The autonomous operation body 10 according to an embodiment of the present disclosure may be an autonomous mobile robot that autonomously moves in a space and performs various kinds of operations. The autonomous operation body 10 may be an autonomous mobile robot that is the shape of an animal such as a human or a dog, and has an operation capability, for example. Alternatively, the autonomous operation body 10 may be a vehicle or another device having a capability for communicating with a user, for example. The levels of the shape, a capability, a desire, and the like of the autonomous operation body 10 according to an embodiment of the present disclosure can be designed as appropriate according to the purpose and the role.

1.2. Example Hardware Configuration of an Autonomous Operation Body 10

Next, an example hardware configuration of an autonomous operation body 10 according to an embodiment of the present disclosure is described. Note that, in the example case described below, the autonomous operation body 10 is a quadrupedal walking robot in the shape of a dog.

FIG. 1 is a diagram showing an example hardware configuration of the autonomous operation body 10 according to an embodiment of the present disclosure. As shown in FIG. 1, the autonomous operation body 10 is a dog-like quadrupedal walking robot having a head, a torso, four legs, and a tail. The autonomous operation body 10 also includes two displays 510 on the head.

The autonomous operation body 10 also includes various kinds of sensors. For example, the autonomous operation body 10 includes microphones 515, cameras 520, a Time of Flight (ToF) sensor 525, a human-presence sensor 530, distance measurement sensors 535, touch sensors 540, an illuminance sensor 545, sole buttons 550, and inertia sensors 555.

Microphones 515

The microphones 515 have a function of collecting ambient sounds. The above sounds include user's utterances and the surrounding environmental sounds, for example. The autonomous operation body 10 may include four microphones on the head, for example. As a plurality of microphones 515 is included, it is possible to collect sound generated in the surroundings with high sensitivity, and realize localization of the sound source.

Cameras 520

The cameras 520 have a function of imaging the user and the ambient environment. The autonomous operation body 10 may include two wide-angle cameras at the tip of the nose and on the waist, for example. In this case, the wide-angle camera disposed at the tip of the nose captures an image corresponding to the front field of view of the autonomous operation body (which is the field of view of the dog), and the wide-angle camera on the waist captures an image of the surrounding region centered on the space above. The autonomous operation body 10 can perform simultaneous localization and mapping (SLAM) by extracting feature points of the ceiling and the like on the basis of the image captured by the wide-angle camera disposed on the waist, for example.

ToF Sensor 525

The ToF sensor 525 has a function of detecting the distance to an object existing in front of the head. The ToF sensor 525 is disposed at the tip of the nose of the head. With the ToF sensor 525, it is possible to detect the distances to various objects with high accuracy, and perform operations in accordance with the relative positions with respect to objects including the user, obstacles, and the like.

Human-Presence Sensor 530

The human-presence sensor 530 has a function of detecting the presence of the user, a pet being kept by the user, or the like. The human-presence sensor 530 is disposed on the chest, for example. With the human-presence sensor 530, it is possible to detect moving objects existing ahead, and perform various operations with respect to the moving objects, such as operations corresponding to emotions including interests, fears, and surprises, for example.

Distance Measurement Sensors 535

The distance measurement sensors 535 have a function of acquiring the state of the floor in front of the autonomous operation body 10. The distance measurement sensors 535 are disposed on the chest, for example. With the distance measurement sensors 535, the distance to an object existing on the floor in front of the autonomous operation body 10 can be detected with high accuracy, and an operation in accordance with the position relative to the object can be performed.

Touch Sensors 540

The touch sensors 540 have a function of detecting contact by a user. The touch sensors 540 are disposed at a position at which the user is likely to touch the autonomous operation body 10, such as the top of the head, the lower chin, and the back, for example. The touch sensors 540 may be capacitive or pressure-sensitive touch sensors, for example. With the touch sensors 540, it is possible to detect contact actions such as touching, stroking, patting, and pressing by the user, and perform operations corresponding to the contact actions.

Illuminance Sensor 545

The illuminance sensor 545 detects the illuminance of the space in which the autonomous operation body 10 exists. The illuminance sensor 545 may be disposed at, for example, the base of the tail on the back of the head, and the like. With the illuminance sensor 545, it is possible to detect the ambient brightness, and perform an operation corresponding to the brightness.

Sole Buttons 550

The sole buttons 550 have a function of detecting whether or not the bottom surfaces of the legs of the autonomous operation body 10 are in contact with the floor. Therefore, the sole buttons 550 are disposed at the portions corresponding to the paws of the four legs. With the sole buttons 550, it is possible to detect contact or non-contact between the autonomous operation body 10 and the floor surface, and for example, recognize that the autonomous operation body 10 is lifted up by the user, and the like.

Inertia Sensors 555

The inertia sensors 555 are six-axis sensor that detect physical quantities such as velocities, accelerations, and rotations of the head and the torso. That is, the inertia sensors 555 detect accelerations and angular velocities of the X-axis, the Y-axis, and the Z-axis. The inertia sensors 555 are disposed on the head and the torso. With the inertia sensors 555, movement of the head and the torso of the autonomous operation body 10 can be detected with high accuracy, and motion control depending on situations can be performed.

An example of the sensors included in the autonomous operation body 10 according to an embodiment of the present disclosure has been described above. Note that the configuration described above with reference to FIG. 1 is merely an example, and the configuration of the sensors included in the autonomous operation body 10 is not limited to such an example. The autonomous operation body 10 may further include a temperature sensor, a geomagnetic sensor, various communication devices including a global navigation satellite system (GNSS) signal receiver, and the like, for example, in addition to the configuration described above. The configuration of the sensors included in the autonomous operation body 10 can be flexibly changed depending on specifications and operations.

Figure 2:
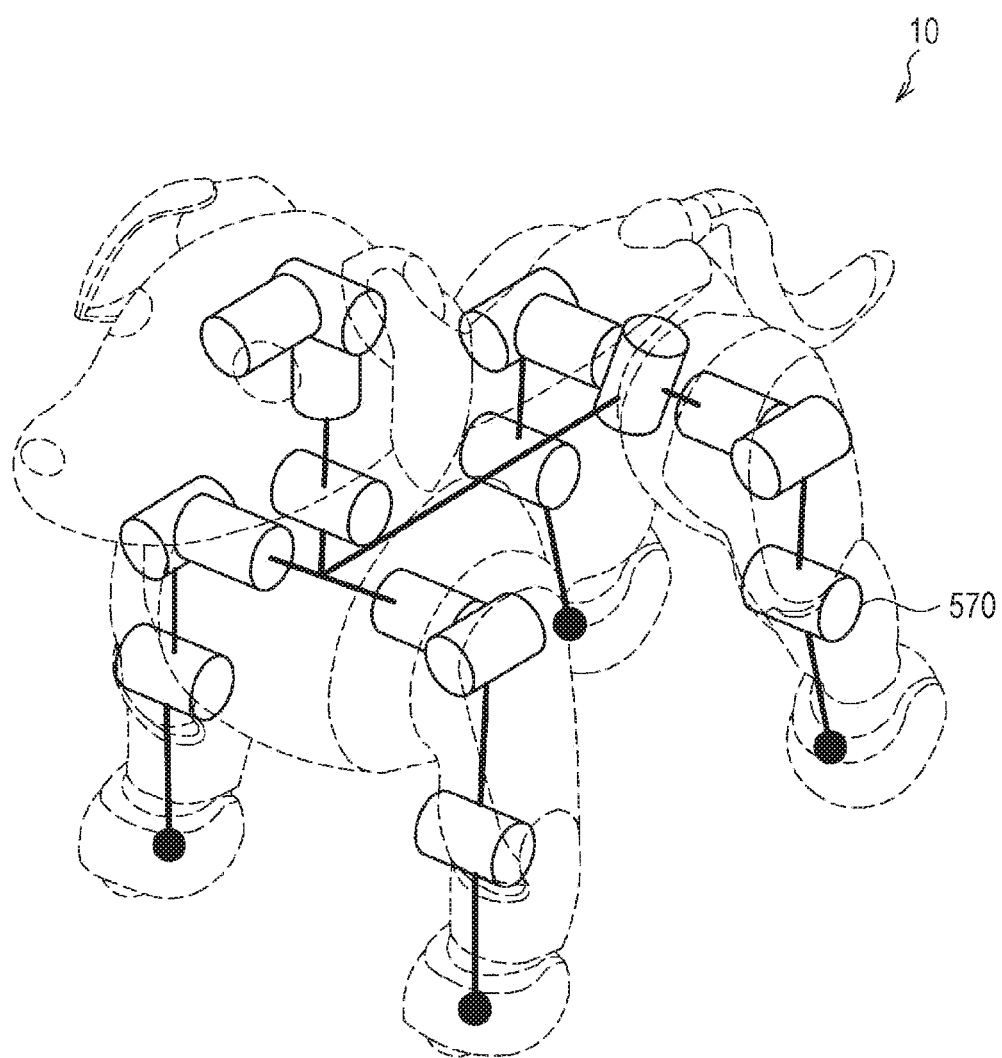
FIG. 2 is an example configuration of actuators included in an autonomous operation body according to an embodiment of the present disclosure.

Next, an example configuration of the joints of the autonomous operation body 10 according to an embodiment of the present disclosure is described. FIG. 2 is an example configuration of actuators 570 included in the autonomous operation body 10 according to an embodiment of the present disclosure. The autonomous operation body 10 according to an embodiment of the present disclosure has a total of 22 rotational degrees of freedom: two each at the ears and the tail, and one in the mouth, in addition to the respective rotational portions shown in FIG. 2.

For example, the autonomous operation body 10 has three degrees of freedom in the head, so that the autonomous operation body 10 can both nod and tilt its head. The autonomous operation body 10 also reproduces waist swinging motions with the actuators 570 in the waist, so that the autonomous operation body 10 can perform natural and flexible behaviors similar to a real dog.

Note that the autonomous operation body 10 according to an embodiment of the present disclosure may achieve the above 22 rotational degrees of freedom by combining uniaxial actuators and biaxial actuators, for example. For example, uniaxial actuators may be adopted in the elbows and knees in the legs, and biaxial actuators may be adopted in the shoulders and the bases of the thighs.

Figure 3:
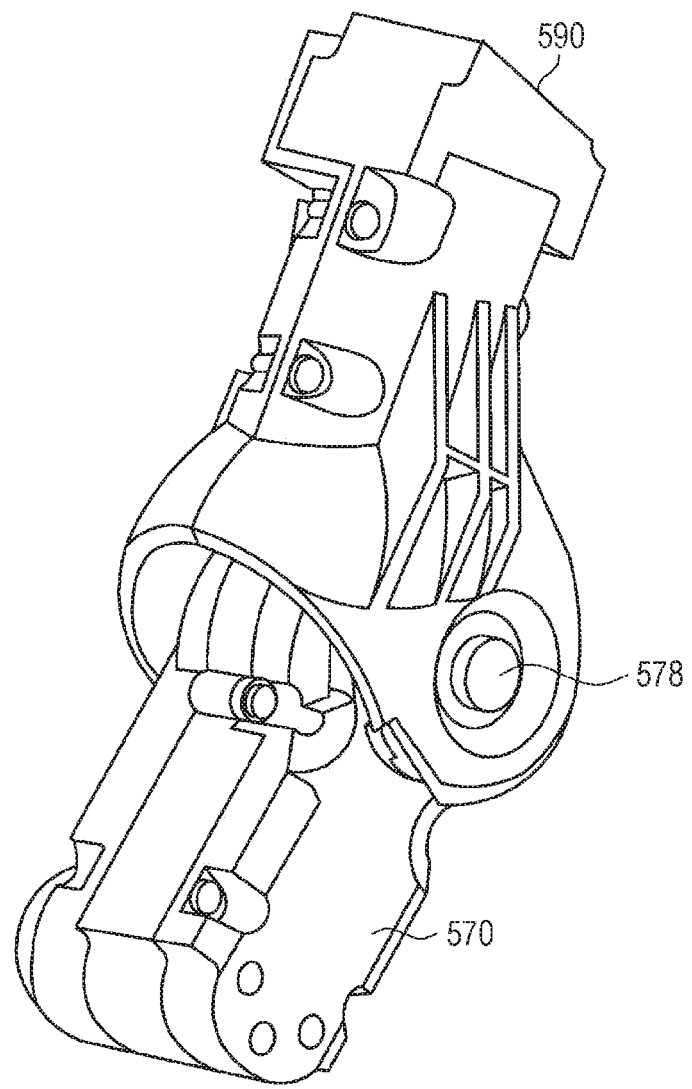
FIG. 3 is a diagram for explaining operation of an actuator included in an autonomous operation body according to an embodiment of the present disclosure.
Figure 4:
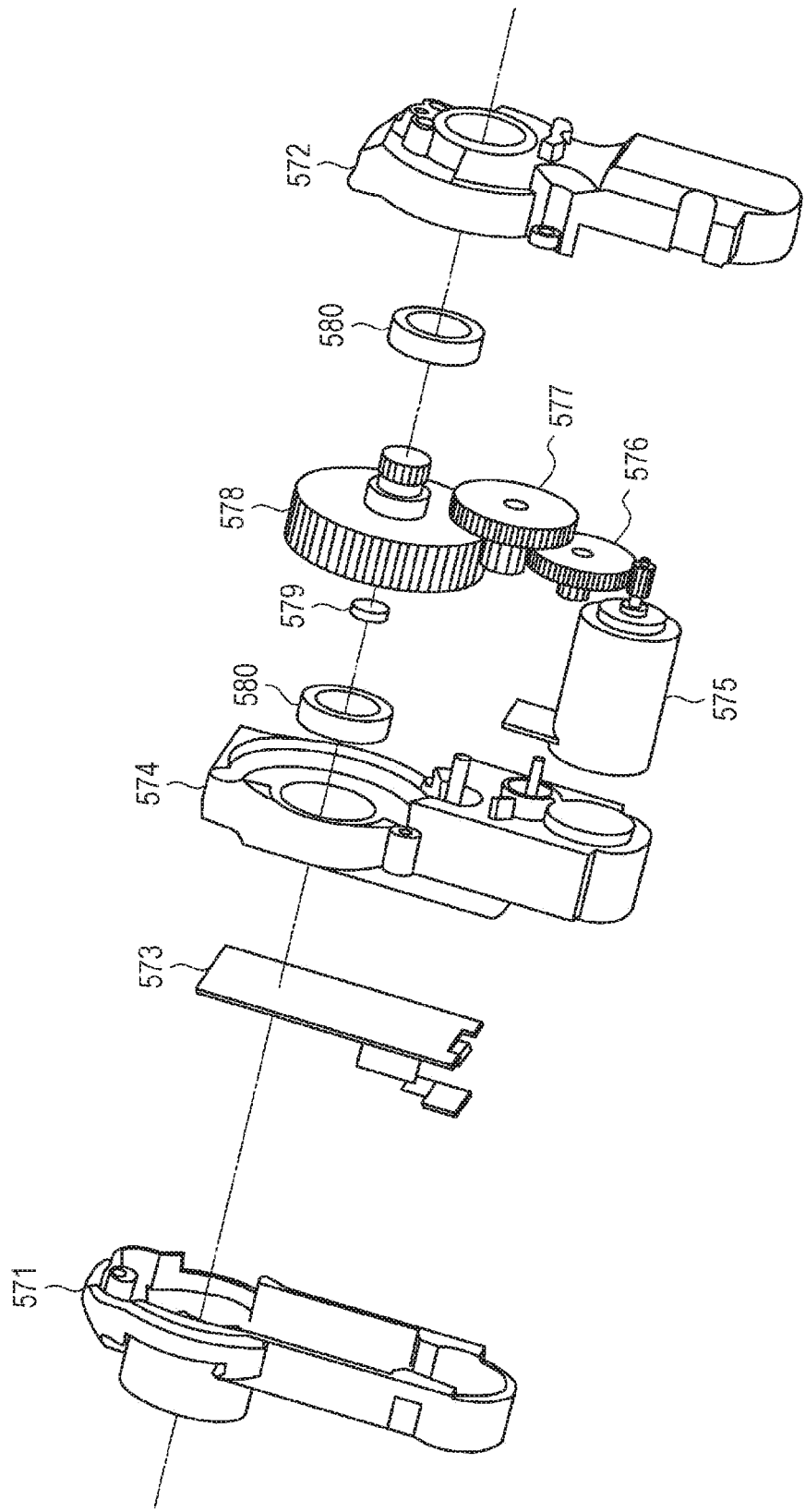
FIG. 4 is a diagram for explaining operation of an actuator included in an autonomous operation body according to an embodiment of the present disclosure.

FIGS. 3 and 4 are diagrams for explaining operation of an actuator 570 included in the autonomous operation body 10 according to an embodiment of the present disclosure. As shown in FIG. 3, the actuator 570 can drive a movable arm 590 at a desired rotating position and a desired rotating velocity by rotating an output gear with a motor 575.

As shown in FIG. 4, an actuator 570 according to an embodiment of the present disclosure includes a rear cover 571, a gear box cover 572, a control board 573, a gear box base 574, the motor 575, a first gear 576, a second gear 577, an output gear 578, a detection magnet 579, and two bearings 580.

The actuator 570 according to an embodiment of the present disclosure may be a magnetic spin-valve giant magnetoresistive (svGMR), for example. Under the control of the main processor, the control board 573 rotates the motor 575, so that power is transmitted to the output gear 578 via the first gear 576 and the second gear 577, and the movable arm 590 can be driven.

Further, a position sensor included in the control board 573 detects the angle of rotation of the detection magnet 579 that rotates in synchronization with the output gear 578, so that the angle of rotation of the movable arm 590, which is the rotating position, can be detected with high accuracy.

Note that, being of a noncontact type, the magnetic svGMR excels in durability. Further, the magnetic svGMR is used in a GMR saturation region, to advantageously reduce influence of signal variations caused by distance variations of the detection magnet 579 and the position sensor.

The above is a description of an example configuration of the actuators 570 included in the autonomous operation body 10 according to an embodiment of the present disclosure. With the configuration described above, it is possible to control bending/stretching actions of the joints included in the autonomous operation body 10 with high accuracy, and correctly detect the rotating positions of the joints.

Figure 5:
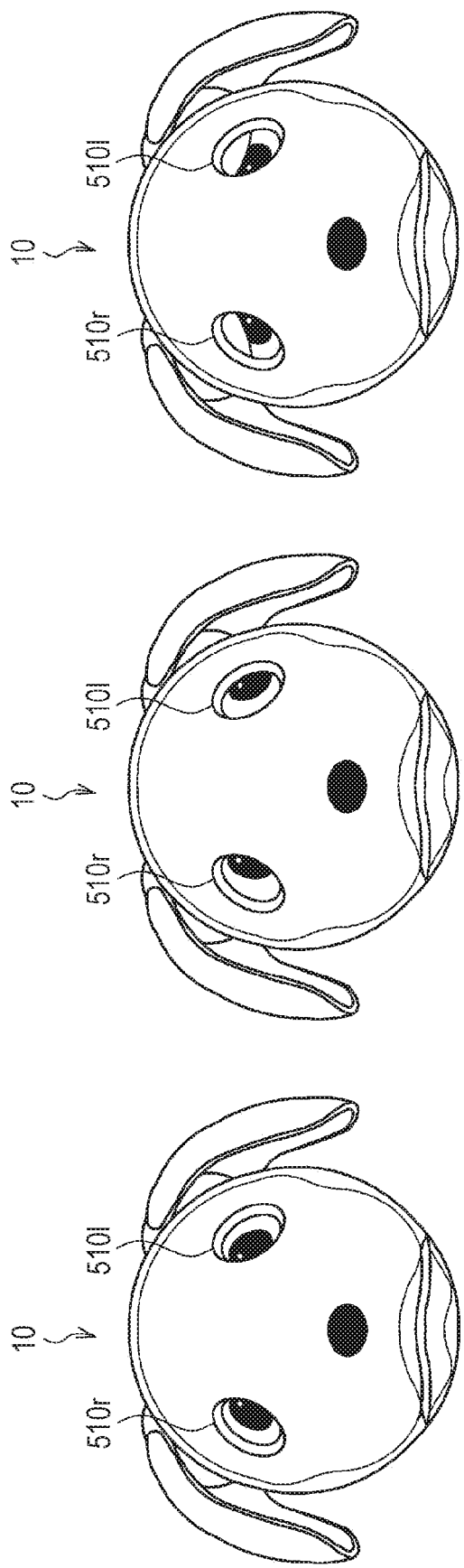
FIG. 5 is a diagram for explaining the functions of displays included in an autonomous operation body according to an embodiment of the present disclosure.

Next, the functions of the displays 510 included in the autonomous operation body 10 according to an embodiment of the present disclosure are described with reference to FIG. 5. FIG. 5 is a diagram for explaining the functions of the displays 510 included in the autonomous operation body 10 according to an embodiment of the present disclosure.

Displays 510

The displays 510 have a function of visually presenting movements of the eyes and emotions of the autonomous operation body 10. As shown in FIG. 5, the displays 510 can express movements of the eyeballs, the pupils, and the eyelids in accordance with emotions and actions. The displays 510 do not display characters, symbols, images that are not related to eye movements, and the like, to produce natural movements similar to those of an actual animal such as a dog.

As shown in FIG. 5, the autonomous operation body 10 also includes two displays 510r and 510l corresponding to the right eye and the left eye, respectively. The displays 510r and 510l are formed with two independent organic light emitting diodes (OLEDs), for example. The OLEDs make it possible to reproduce the curved surfaces of the eyeballs, and realize a more natural exterior than in a case where the pair of eyeballs is formed with a single flat display, or where the two eyes are formed with two independent flat displays.

As described above, with the displays 510r and 510l, it is possible to express lines of sight and emotions of the autonomous operation body 10 as shown in FIG. 5 with high accuracy and flexibility. Further, the user can intuitively understand the state of the autonomous operation body 10 from eye movements displayed on the displays 510.

Figure 6:
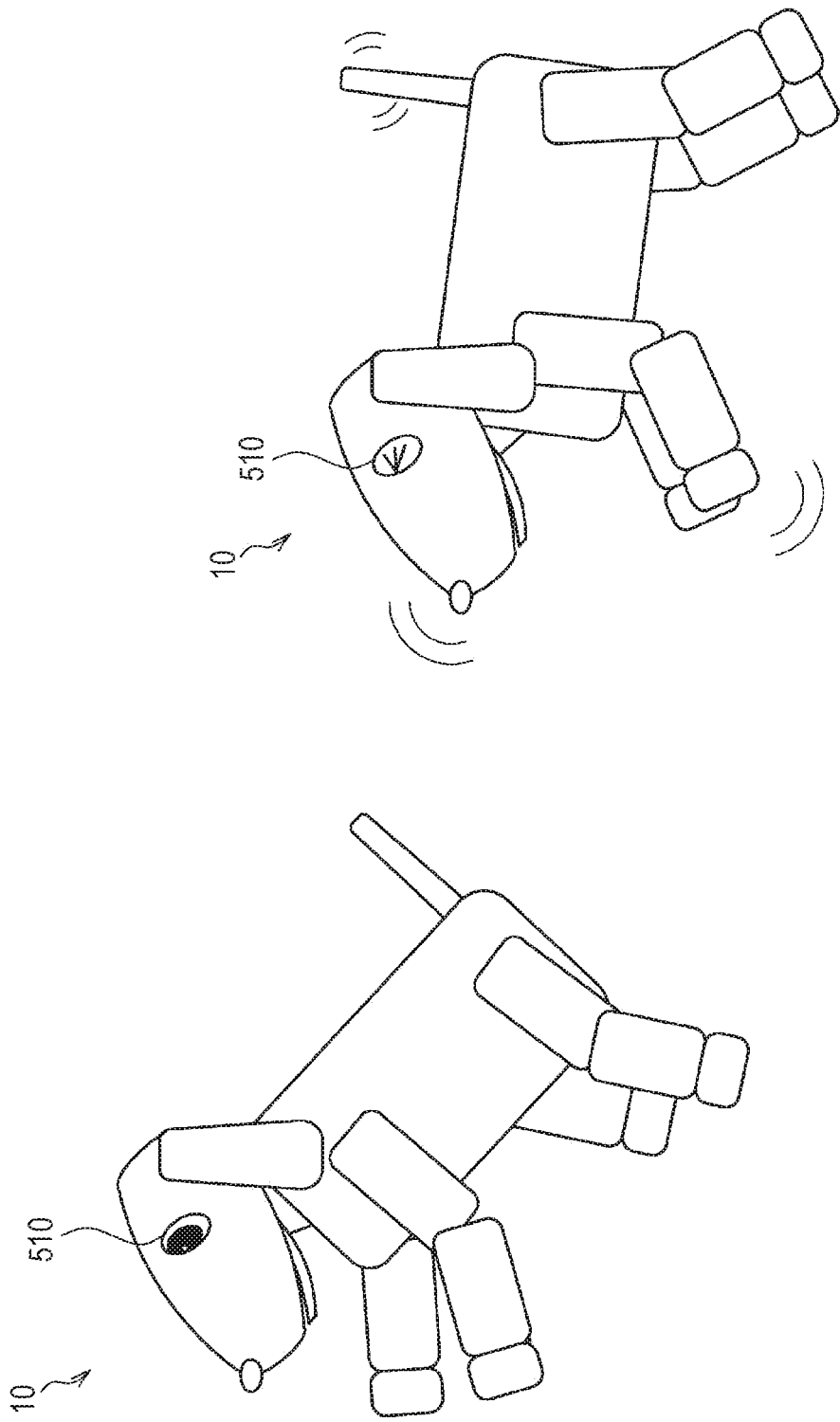
FIG. 6 is a diagram showing an example operation of an autonomous operation body according to an embodiment of the present disclosure.

The above is a description of the example hardware configuration of the autonomous operation body 10 according to an embodiment of the present disclosure. With the configuration described above, movements of the joints and the eyeballs of the autonomous operation body 10 are flexibly controlled with high accuracy, so that movements and emotional expressions similar to those of an actual animal can be obtained as shown in FIG. 6. Although FIG. 6 is a diagram showing an example operation of the autonomous operation body 10 according to an embodiment of the present disclosure, FIG. 6 shows a simplified view of the external structure of the autonomous operation body 10, to explain mainly movements of the joints and the eyeballs of the autonomous operation body 10. Likewise, in the description below, the external structure of the autonomous operation body 10 will be simplified in some cases, but the hardware configuration and the exterior of the autonomous operation body 10 according to an embodiment of the present disclosure may be designed as appropriate, without being limited to the example shown in the drawings.

1.3. Example System Configuration

Figure 7:
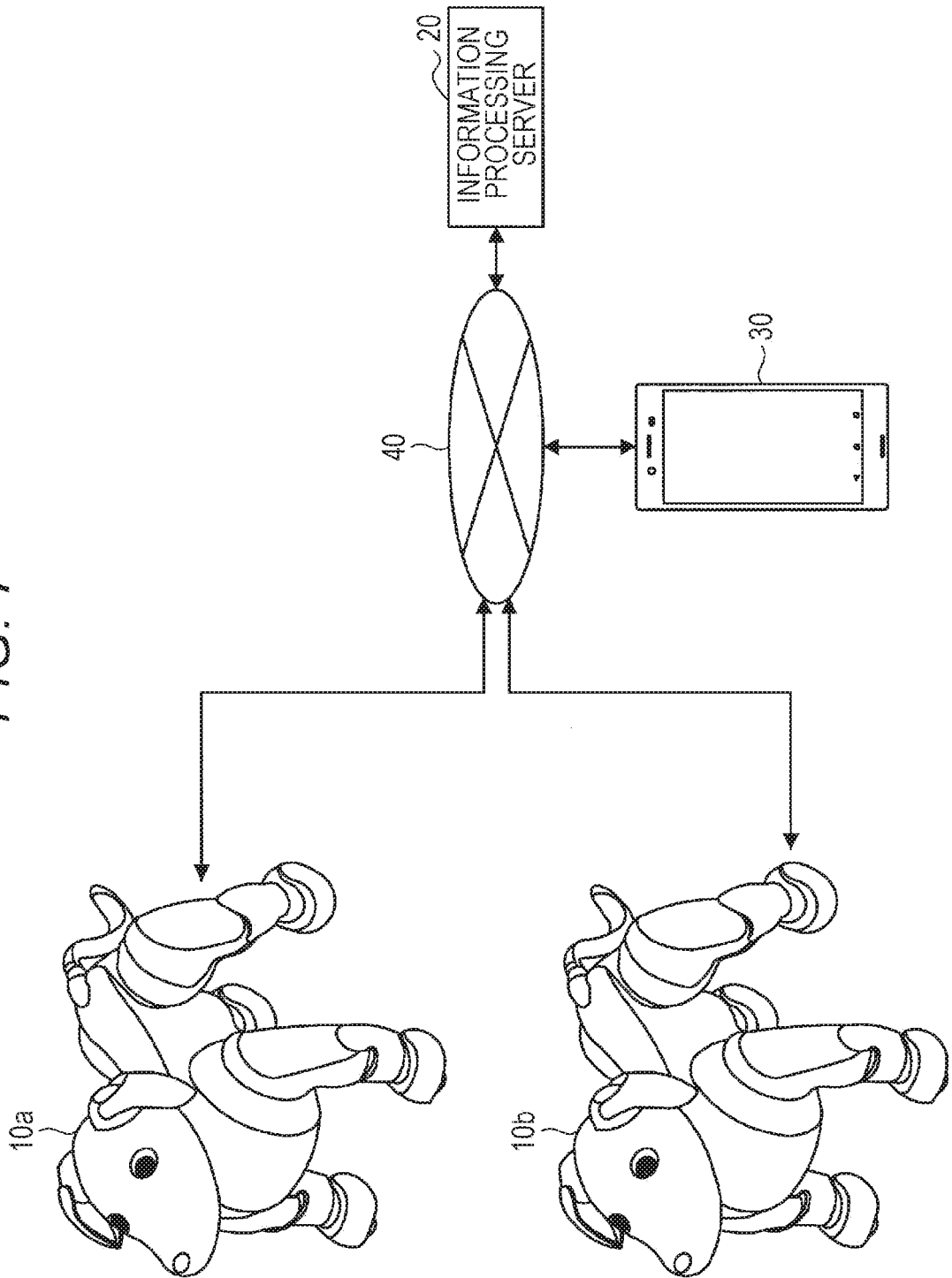
FIG. 7 is a diagram showing an example system configuration according to an embodiment of the present disclosure.

Next, an example system configuration according to an embodiment of the present disclosure is described. FIG. 7 is a diagram showing an example system configuration according to an embodiment of the present disclosure. As shown in FIG. 7, an information processing system according to an embodiment of the present disclosure includes a plurality of autonomous operation bodies 10, an information processing server 20, and an information processing terminal 30. Note that the respective components included in the information processing system are connected via a network 40 so that they can communicate with one another.

Autonomous Operation Bodies 10

An autonomous operation body 10 according to an embodiment of the present disclosure is an information processing device that estimates situations on the basis of collected sensor information, and autonomously selects and performs various operations depending on the situations. As described above, ab autonomous operation body 10 according to an embodiment of the present disclosure may be an autonomous mobile robot that is in the shape of an animal such as a human or a dog, and has an operation capability, for example.

Information Processing Server 20

The information processing server 20 according to an embodiment of the present disclosure is an information processing device that is connected to a plurality of autonomous operation bodies 10, and has a function of collecting various kinds of information from the autonomous operation bodies 10. The information processing server 20 can analyze the state of the hardware of an autonomous operation body 10, the user's degree of enthusiasm for the autonomous operation body 10, and the like, on the basis of sensor information collected by the autonomous operation body 10, for example.

The information processing server 20 also has a function of presenting a recommended action to be performed by an autonomous operation body 10 in a situation estimated by the autonomous operation body 10. In this case, the information processing server 20 may transmit, to the autonomous operation body 10, control sequence data for causing the autonomous operation body 10 to perform the recommended action.

The information processing server 20 according to an embodiment of the present disclosure also controls operation of an application relating to communication between an autonomous operation body 10 and the user. In the application, the information processing server 20 may dynamically control the output expression of an avatar reflecting the state of the autonomous operation body, for example. The information processing server 20 also has a function of causing the autonomous operation body 10 to reflect a user operation performed on the avatar described above. With the above functions of the information processing server 20, it is possible to realize communication between an autonomous operation body 10 and the user, not depending on the locations of the autonomous operation body 10 and the user.

Information Processing Terminal 30

The information processing terminal 30 according to an embodiment of the present disclosure is an information processing device that provides a user with a user interface relating to the above described application. The information processing terminal 30 according to an embodiment of the present disclosure may be a mobile phone, a smartphone, a tablet, any of various wearable devices, a general-purpose computer, or the like, which is owned by the user, for example.

Network 40

The network 40 has a function of connecting the respective components included in the information processing system. The network 40 may include a public line network such as the Internet, a telephone line network, and a satellite communication network, various kinds of local area networks (LANs) including Ethernet (registered trademark), wide area networks (WANs), and the like. The network 40 may also include a dedicated line network such as an Internet protocol-virtual private network (IP-VPN). The network 40 may further include a wireless communication network such as Wi-Fi (registered trademark) and Bluetooth (registered trademark).

The above is a description of an example system configuration according to an embodiment of the present disclosure. Note that the configuration described above with reference to FIG. 7 is merely an example, and the configuration of the information processing system according to an embodiment of the present disclosure is not limited to the example. For example, the autonomous operation body 10 may further perform information communication with various kinds of external devices other than the information processing server 20. The external devices described above may include a server that transmits weather, news, and other service information, various kinds of information processing terminals owned by the user, and home appliances, for example. The system configuration according to an embodiment of the present disclosure can be flexibly modified depending on specifications and operations.

1.4. Example Functional Configuration of an Autonomous Operation Body 10

Figure 8:
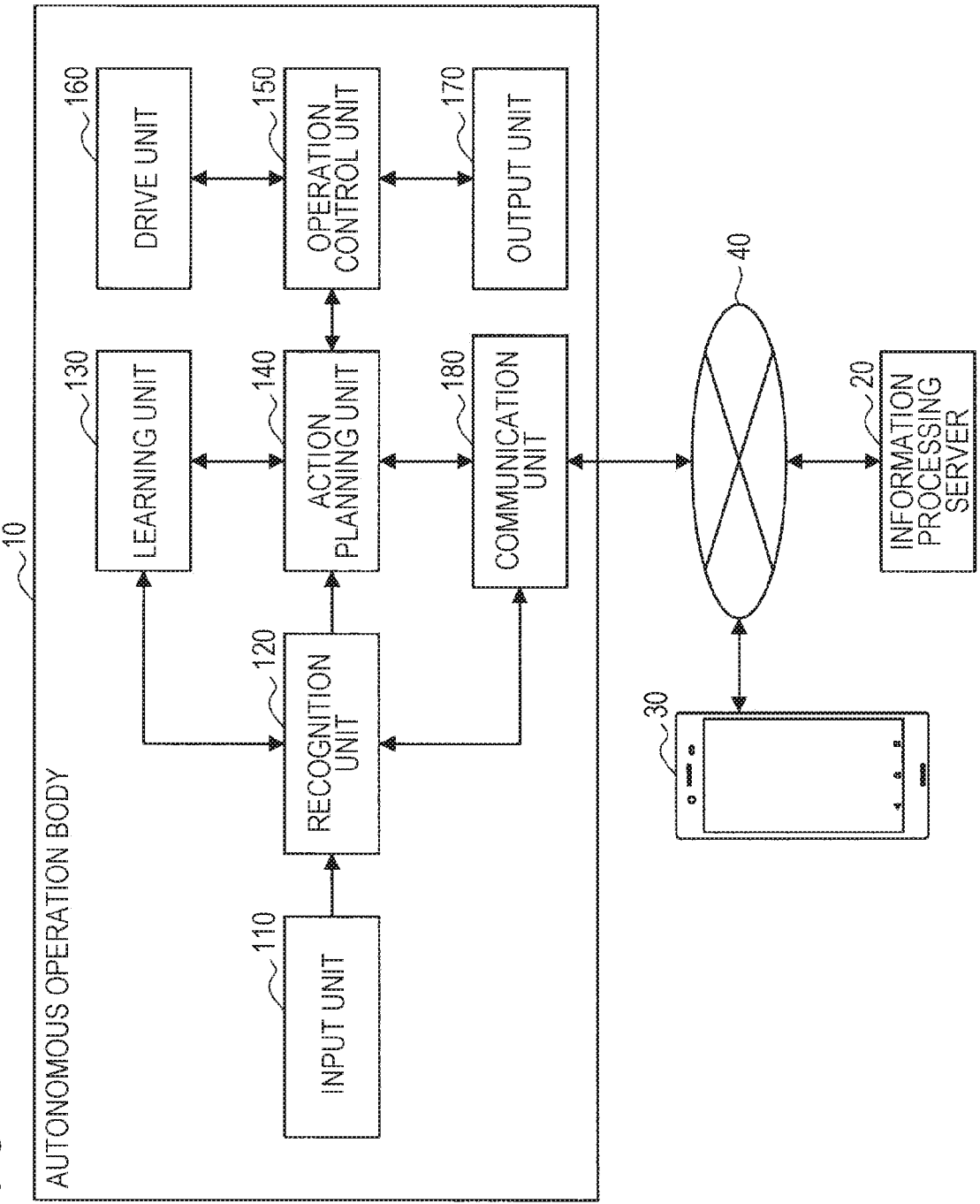
FIG. 8 is a diagram showing an example functional configuration of an autonomous operation body according to an embodiment of the present disclosure.

Next, an example functional configuration of an autonomous operation body 10 according to an embodiment of the present disclosure is described. FIG. 8 is a diagram showing an example functional configuration of an autonomous operation body 10 according to an embodiment of the present disclosure. As shown in FIG. 8, the autonomous operation body 10 according to an embodiment of the present disclosure includes an input unit 110, a recognition unit 120, a learning unit 130, an action planning unit 140, an operation control unit 150, a drive unit 160, an output unit 170, and a communication unit 180.

Input Unit 110

The input unit 110 has a function of collecting various kinds of information relating to the user and the ambient environment. The input unit 110 collects user's utterances and environmental sounds generated around the user, image information relating to the user and the ambient environment, and various kinds of sensor information, for example. To do so, the input unit 110 includes the various kinds of sensors shown in FIG. 1.

Recognition Unit 120

The recognition unit 120 has a function of performing various kinds of recognition relating to the user, the ambient environment, and the state of the autonomous operation body 10, on the basis of the various kinds of information collected by the input unit 110. In an example, the recognition unit 120 may perform human identification, facial expression and sight line recognition, object recognition, color recognition, shape recognition, marker recognition, obstacle recognition, step recognition, brightness recognition, and the like.

The recognition unit 120 also performs emotion recognition relating to the user's voice, word recognition, sound source localization, and the like. The recognition unit 120 can also recognize contact by a user or the like, the ambient temperature, the presence of a moving object, the posture of the autonomous operation body 10, and the like.

The recognition unit 120 further has a function of estimating and understanding the ambient environment and the situation in which the autonomous operation body 10 is currently in, on the basis of the information recognized as above. In doing so, the recognition unit 120 may comprehensively estimate the situation, using environmental knowledge stored therein in advance.

Learning Unit 130

The learning unit 130 has a function of learning environment (situation) and an action, and the effects of the action on the environment. The learning unit 130 performs the learning described above, using a machine learning algorithm such as deep learning, for example. Note that the learning algorithm adopted by the learning unit 130 is not limited to the example described above, and can be designed as appropriate.

Action Planning Unit 140

The action planning unit 140 has a function of planning an action to be performed by the autonomous operation body 10, on the basis of the situation estimated by the recognition unit 120 and the knowledge learned by the learning unit 130. The functions of the action planning unit 140 according to an embodiment of the present disclosure will be described later in detail.

Operation Control Unit 150

The operation control unit 150 has a function of controlling operations of the drive unit 160 and the output unit 170, on the basis of the action planned by the action planning unit 140. The operation control unit 150 performs rotation control on the actuators 570, display control on the displays 510, sound output control on a speaker, and the like, on the basis of the action plan described above, for example. The functions of the operation control unit 150 according to an embodiment of the present disclosure will be described later in detail.

Drive Unit 160

The drive unit 160 has a function of causing the plurality of joints of the autonomous operation body 10 to bend and stretch, under the control of the operation control unit 150. More specifically, the drive unit 160 drives the actuators 570 provided at the respective joints, under the control of the operation control unit 150.

Output Unit 170

The output unit 170 has a function of outputting visual information and audio information, under the control of the operation control unit 150. Therefore, the output unit 170 includes the displays 510 and a speaker.

Communication Unit 180

The communication unit 180 has a function of performing information communication with the information processing server 20, the information processing terminal 30, and another autonomous operation body 10. For example, the communication unit 180 transmits information relating to the situation recognized by the recognition unit 120 and the like, to the information processing server 20. The communication unit 180 also receives, from the information processing server 20, a recommended action, control sequence data relating to the recommended action, and the data corresponding to a reward described later, for example.

The above is an example functional configuration of an autonomous operation body 10 according to an embodiment of the present disclosure. Note that the configuration described above with reference to FIG. 8 is merely an example, and the functional configuration of an autonomous operation body 10 according to an embodiment of the present disclosure is not limited to this example. The functional configuration of an autonomous operation body 10 according to an embodiment of the present disclosure can be flexibly modified depending specifications and operations.

1.5. Example Functional Configuration of the Information Processing Server 20

Figure 9:
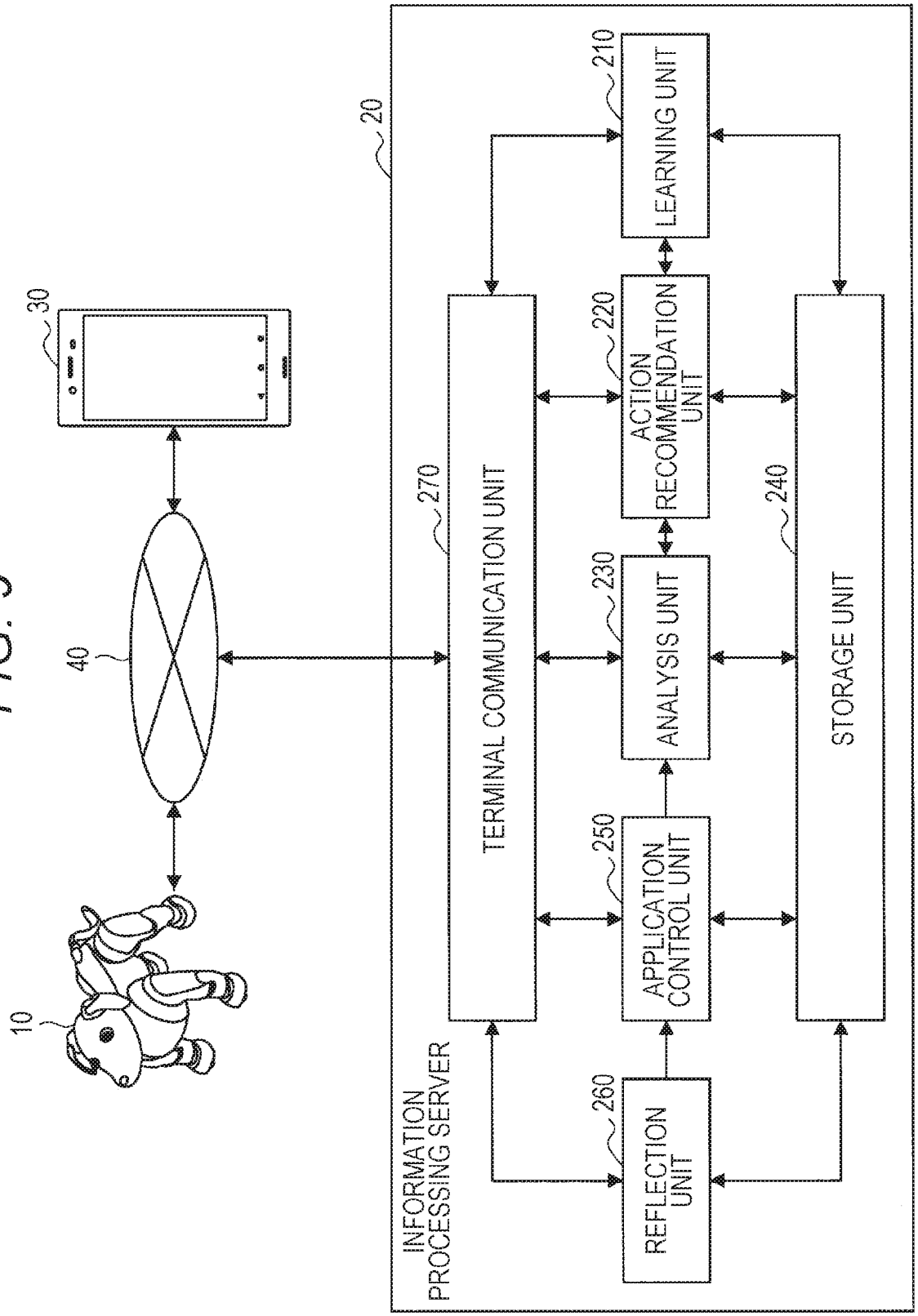
FIG. 9 is a diagram showing an example functional configuration of an information processing server according to an embodiment of the present disclosure.

Next, an example functional configuration of the information processing server 20 according to an embodiment of the present disclosure is described. FIG. 9 is a diagram showing an example functional configuration of the information processing server 20 according to an embodiment of the present disclosure. As shown in FIG. 9, the information processing server 20 according to an embodiment of the present disclosure includes a learning unit 210, an action recommendation unit 220, an analysis unit 230, a storage unit 240, an application control unit 250, a reflection unit 260, and a terminal communication unit 270.

Learning Unit 210

The learning unit 130 has a function of learning environment (situation) and an action, and the effects of the action on the environment. In this case, the learning unit 210 characteristically performs learning based on an action history collected from the plurality of autonomous operation bodies 10. In other words, the learning unit 210 can be regarded as collective intelligence shared by the plurality of autonomous operation bodies 10.

Action Recommendation Unit 220

The action recommendation unit 220 has a function of determining an action to be recommended to an autonomous operation body 10, on the basis of information relating to an estimated situation received from the autonomous operation body 10, and the knowledge held as the collective intelligence by the learning unit 210. Further, one of the features of the action recommendation unit 220 is to transmit a recommended action and control sequence data for causing the autonomous operation body 10 to perform the recommended action, to the autonomous operation body via the terminal communication unit 270.

Here, the control sequence data described above is information including control signals relating to chronological changes in the rotating positions of the joints of the autonomous operation body 10, eyeball expressions, and sound outputs. That is, the control sequence data can be regarded as settings data for causing the autonomous operation body 10 to perform a desired operation (action).

With the above functions of the action recommendation unit 220 according to an embodiment of the present disclosure, a new action that can be performed by the autonomous operation body 10 can be added at any time, the user's interest in the autonomous operation body 10 can be continuously maintained, and the like.

Analysis Unit 230

The analysis unit 230 has a function of performing various kinds of analysis, on the basis of information received from an autonomous operation body 10. The analysis unit 230 can analyze the states of the actuators 570 and the like, on the basis of an action history and an operational status received from the autonomous operation body 10, for example. The analysis unit 230 can also analyze the user's interest in (enthusiasm for) the autonomous operation body 10 or the like, on the basis of information about the user's contact and reaction received from the autonomous operation body 10, and the like.

Storage Unit 240

The storage unit 240 has a function of accumulating information to be used by the respective components of the information processing server 20. The storage unit 240 stores control sequence data received from an autonomous operation body 10 associated with the situation and the user's reaction, for example. The storage unit 240 also stores information to be used by the analysis unit 230 in performing analysis, and analysis results. The storage unit 240 also stores various kinds of data relating to applications and rewards described later.

Application Control Unit 250

The application control unit 250 controls operation of an application relating to communication between an autonomous operation body 10 and the user. The application control unit 250 controls the operation and the output expression of an avatar imitating the autonomous operation body 10 in the application, for example. In doing so, the application control unit 250 may perform output control reflecting the operating condition and the emotion of the autonomous operation body 10. The functions of the application control unit 250 will be described later in detail.

Reflection Unit 260

The reflection unit 260 has a function of causing an autonomous operation body 10 to reflect a user operation in an application. The reflection unit 260 can cause an autonomous operation body 10 to reflect a reward obtained by the avatar, on the basis of an operation performed by the user, for example. The functions of the reflection unit 260 will be described later in detail.

Terminal Communication Unit 270

The terminal communication unit 270 has a function of performing information communication with the plurality of autonomous operation bodies 10 via the network 40. The terminal communication unit 270 receives information relating to an estimated situation from an autonomous operation body 10, for example. The terminal communication unit 270 also transmits information relating to a recommended action determined by the action recommendation unit 220 and control sequence data, to the autonomous operation body 10, for example.

Under the control of the reflection unit 260, the terminal communication unit 270 also transmits, to the autonomous operation body 10, various kinds of control signals for causing the autonomous operation body 10 to reflect settings made by the user in an application and a reward obtained by the avatar.

The above is a description of an example functional configuration of the information processing server 20 according to an embodiment of the present disclosure. Note that the configuration described above with reference to FIG. 9 is merely an example, and the functional configuration of the information processing server 20 according to an embodiment of the present disclosure is not limited to this example. For example, the various kinds of functions of the information processing server 20 may be scattered over a plurality of devices. The functional configuration of the information processing server 20 according to an embodiment of the present disclosure can be flexibly modified depending specifications and operations.

1.6. Example Functional Configuration of the Information Processing Terminal 30

Figure 10:
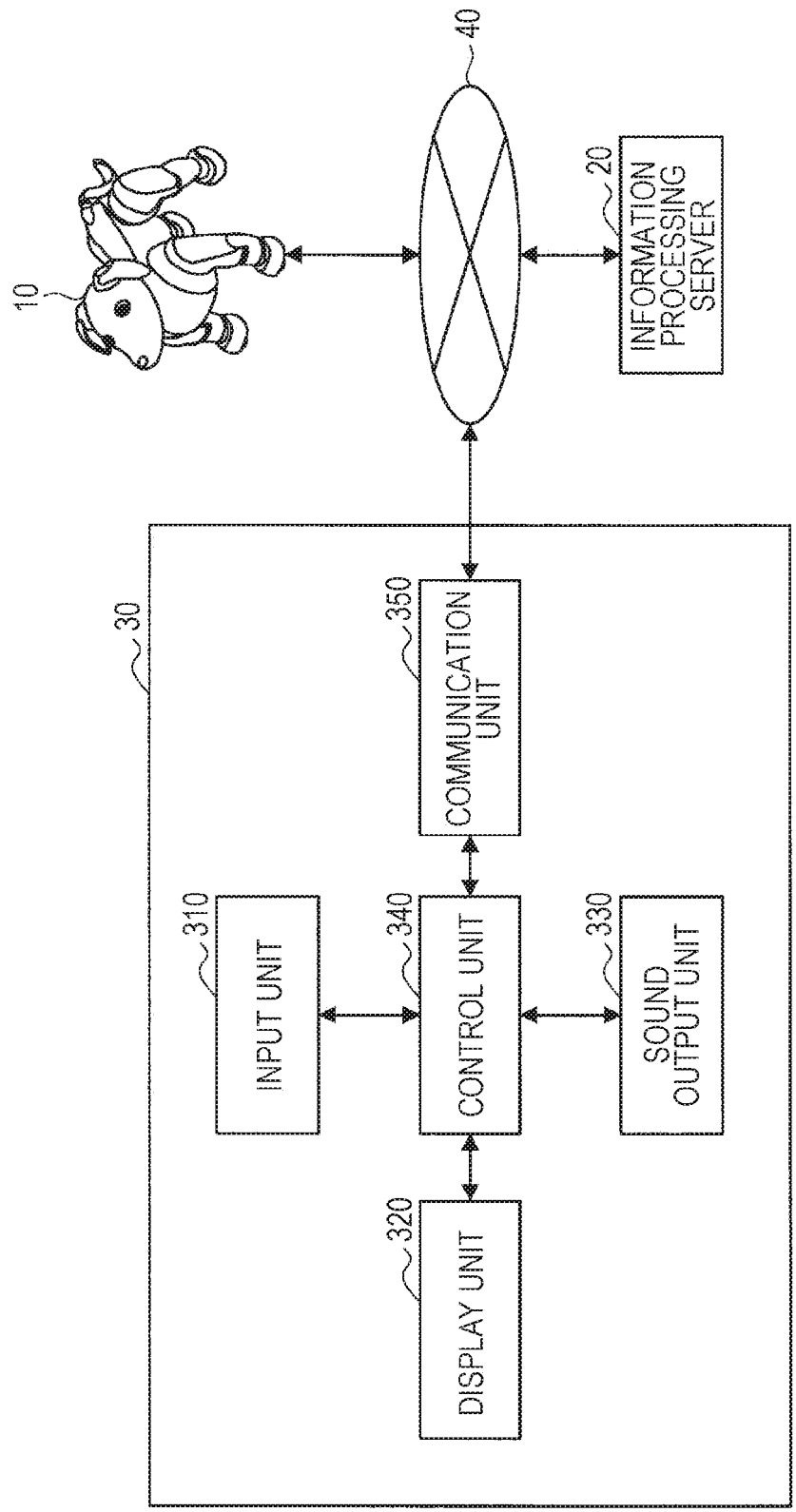
FIG. 10 is a diagram showing an example functional configuration of an information processing terminal according to an embodiment of the present disclosure.

Next, an example functional configuration of the information processing terminal 30 according to an embodiment of the present disclosure is described. FIG. 10 is a diagram showing an example functional configuration of the information processing terminal 30 according to an embodiment of the present disclosure. As shown in FIG. 10, the information processing terminal 30 according to an embodiment of the present disclosure includes an input unit 310, a display unit 320, a sound output unit 330, a control unit 340, and a communication unit 350.

Input Unit 310

The input unit 310 has a function of detecting an input operation performed by the user. Therefore, the input unit 310 includes a keyboard, a touch panel, various kinds of buttons, and the like. The input unit 310 may also include a microphone or the like that detects a voice input by the user. The input unit 310 may further include an imaging device that captures an image of the user or the like.

Display Unit 320

The display unit 320 has a function of presenting various kinds of visual information to the user. For example, the display unit 320 displays a user interface relating to the application described above, under the control of the information processing server 20. To do so, the display unit 320 includes various kinds of display devices.

Sound Output Unit 330

The sound output unit 330 has a function of outputting various kinds of sound. For example, the sound output unit 330 outputs various kinds of sound relating to the application described above, under the control of the information processing server 20. To do so, the sound output unit 330 includes a speaker, an amplifier, and the like.

Control Unit 340

The control unit 340 comprehensively controls the respective components included in the information processing terminal 30. The control unit 340 may control activation and suspension of each component, for example. The control unit 340 also has a function of transferring various kinds of control signals generated by the information processing server 20 to the display unit 320 and the sound output unit 330. The control unit 340 may also have functions equivalent to those of the application control unit 250 and the reflection unit 260 of the information processing server 20.

Communication Unit 350

The communication unit 350 performs information communication with the information processing server 20 and the autonomous operation bodies 10 via the network 40. For example, the communication unit 350 receives, from the information processing server 20, a control signal relating to an application, and data relating to a reward described below. The communication unit 350 also transmits information relating to the user's operation detected by the input unit 310 to the information processing server 20, for example.

The above is a description of an example functional configuration of the information processing terminal 30 according to an embodiment of the present disclosure. Note that the functional configuration described above with reference to FIG. 10 is merely an example, and the functional configuration of the information processing terminal 30 according to an embodiment of the present disclosure is not limited to this example. For example, the information processing terminal 30 may have functions equivalent to those of the application control unit 250 and the reflection unit 260 of the information processing server 20, as described above. The functional configuration of the information processing terminal 30 according to an embodiment of the present disclosure can be flexibly modified depending specifications and operations.

2. First Embodiment 2.1. Overview

Next, a first embodiment of the present disclosure is described. As described above, an autonomous operation body 10 according to an embodiment of the present disclosure includes the displays 510 that express movements of a plurality of joints and the eyeballs, and thus, is capable of performing various kinds of operations. Such autonomous operations as described above may be performed even when the user is absent.

In general, however, the user can sense operations of the autonomous operation body 10 and communicate with the autonomous operation body 10 only in a case where the two share the same physical space. For this reason, in a case where the user tends to be away from home for work or school, for example, the user can neither know the actions of the autonomous operation body 10 for many hours of the day, nor communicate with the autonomous operation body 10.

In this case, it is assumed that the user cannot fully enjoy the advantage of owning the autonomous operation body 10, and, as a result of intermittent communication due to the absence of the user, the user might gradually lose interest in the autonomous operation body 10.

To counter the above problem, it is possible for the user, for example, to remotely monitor the state of the autonomous operation body 10 from a place away from home, and the like. In this case, however, the user hardly enjoys interactive communication with the autonomous operation body 10, while being able to know the state of the autonomous operation body 10.

Therefore, an information processing server 20 according to the first embodiment of the present disclosure provides the user with an application that enables interactive communication between an autonomous operation body 10 and the user, to solve the above problem.

The information processing server 20 according to this embodiment may control operation of an avatar imitating the autonomous operation body 10 owned by the user in the application described above, for example. In doing so, the information processing server 20 according to this embodiment may cause the output expression of the avatar to reflect the current state of the autonomous operation body 10. The state described above includes an autonomous operation being performed by the autonomous operation body 10, an emotion of the autonomous operation body 10, and the like, for example.

With the above function of the information processing server 20 according to this embodiment, the user can know the current state of the autonomous operation body 10 even from outside the home, and can obtain a feeling of being with the autonomous operation body 10 all the like. Thus, an effect to maintain the user's interest in the autonomous operation body 10 can be expected.

Further, one of the features of the information processing server 20 according to this embodiment is a function of causing the autonomous operation body 10 to reflect an operation performed on the avatar by the user. The information processing server 20 may provide game content for enabling communication between the avatar and the user, for example. In doing so, the information processing server 20 can give a reward on the basis of an operation performed on the avatar by the user in the game content, and cause the autonomous operation body 10 to reflect the reward.

For example, in the game content described above, the user may be able to perform various communication-related operations on the avatar, such as touching, stroking, and playing with a toy such as a ball. In this case, the information processing server 20 according to this embodiment gives a reward on the basis of a fact that the intensity of the communication has exceeded a predetermined value, and causes the avatar and the autonomous operation body 10 to reflect the reward. Here, the reward described above may be a variation relating to the exterior or voice of the autonomous operation body 10, a new operation that the autonomous operation body 10 can perform, or the like, for example.

That is, by deepening the communication with the avatar in the application, the user can enjoy the result of the communication as a functional enhancement of the autonomous operation body 10. With the above functions of the information processing server 20 according to this embodiment, even from outside the home or the like, the user can continue to have interactive communication with the autonomous operation body 10. Thus, It is possible to maintain the user's interest in the autonomous operation body 10, and satisfy the user's desire to be with the autonomous operation body 10 all the time.

2.2. Details of the Application

In the description below, the functions of the application according to this embodiment are described in detail, with reference to specific examples. As described above, the application according to this embodiment includes game content that enables communication between an avatar imitating an autonomous operation body 10 and the user.

On the other hand, the functions of the application according to this embodiment are not limited to the examples. The application according to this embodiment widely covers functions for allowing the user to know the state of the autonomous operation body 10 and functions for causing the autonomous operation body 10 to reflect settings made by the user.

The application according to this embodiment may also have a function for presenting a notification from the distributor of the autonomous operation body 10 to the user, and a function of activating communication between users. The application according to this embodiment may be a comprehensive application including various kinds of functions for enhancing convenience for the user owning the autonomous operation body 10.

Figure 11:
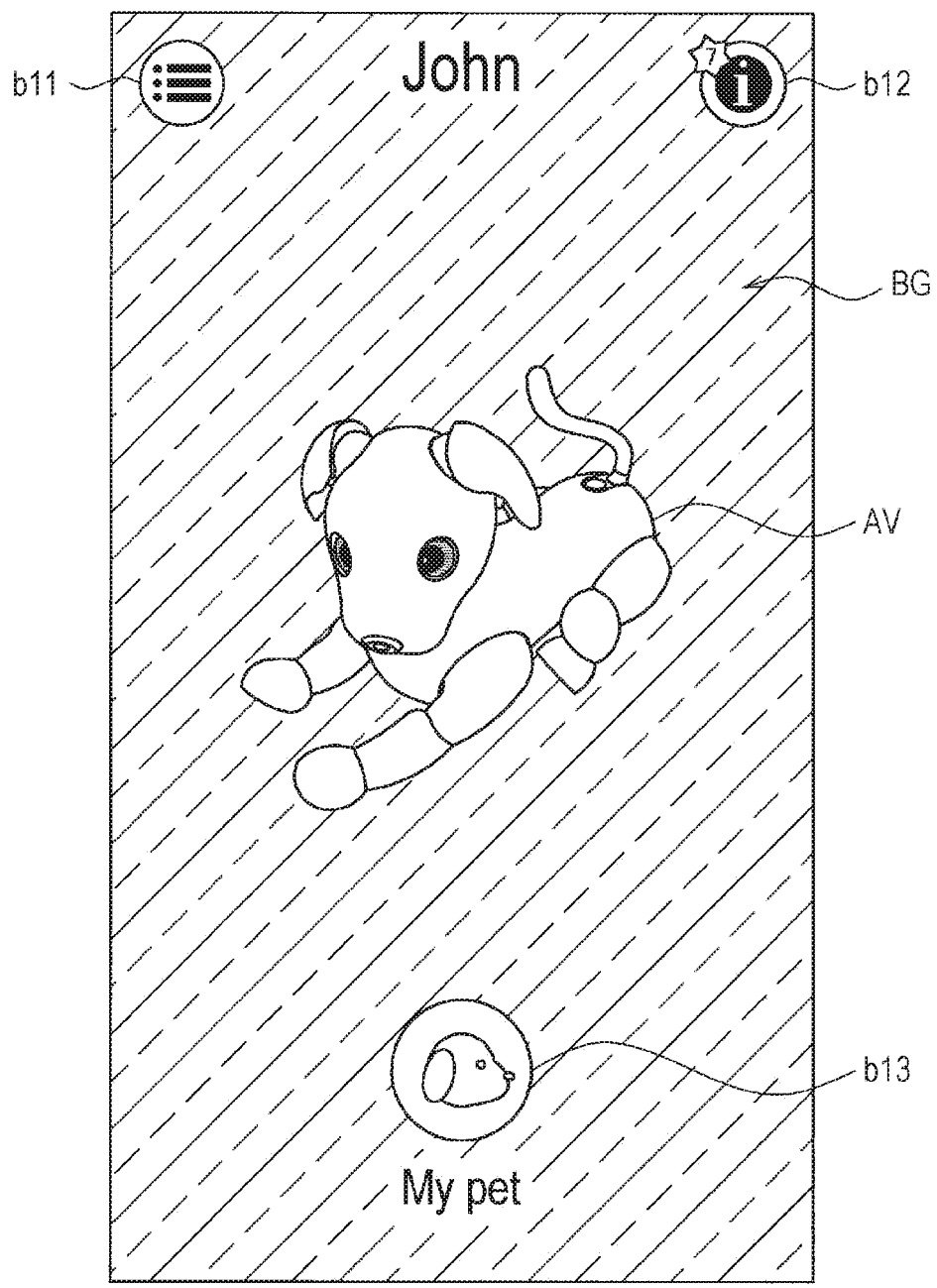
FIG. 11 is a diagram showing an example of the home screen of an application according to an embodiment of the present disclosure.
Figure 12:
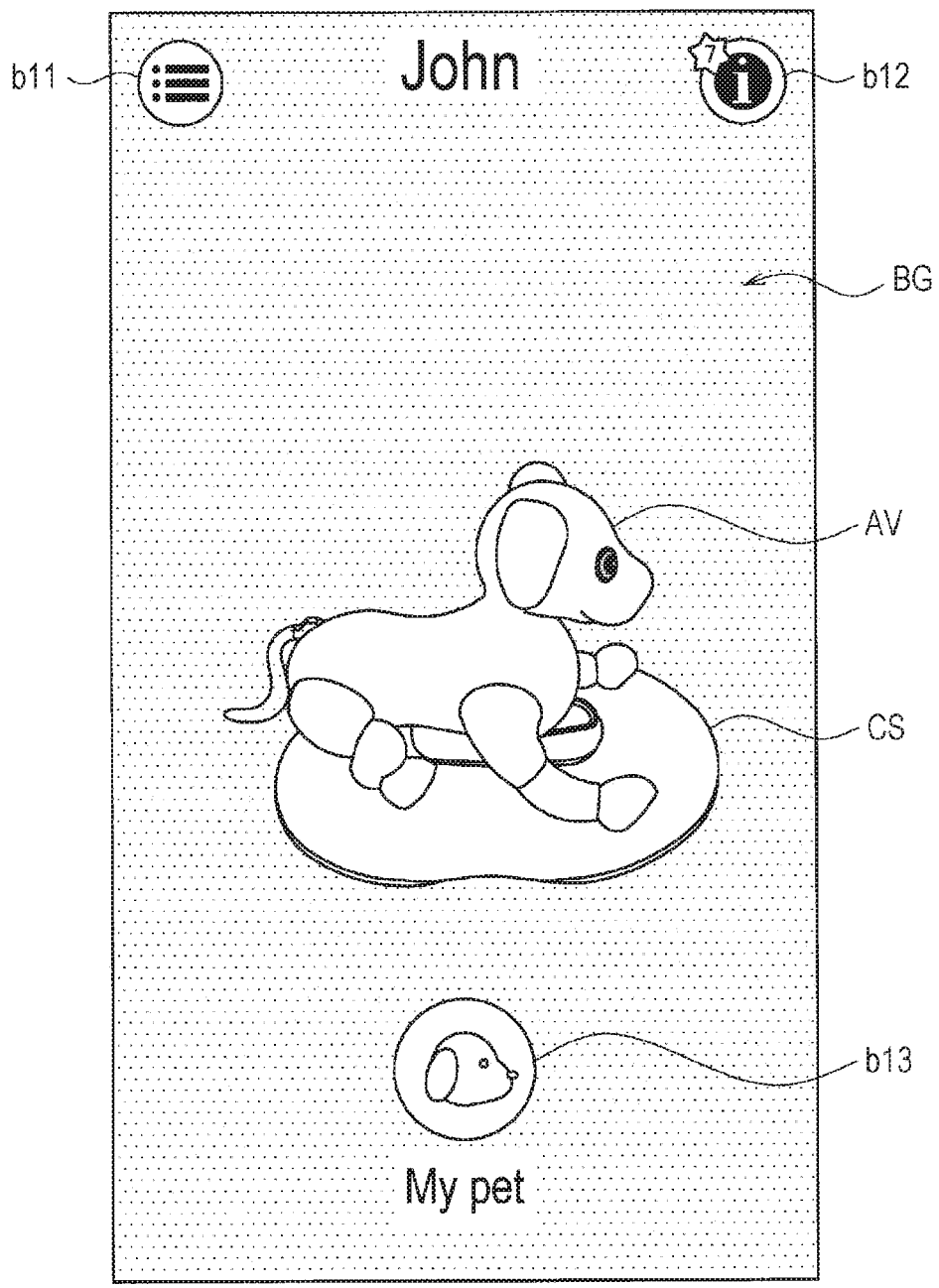
FIG. 12 is a diagram showing an example of the home screen of the application according to the embodiment.

First, the home screen of the application according to this embodiment is described. FIGS. 11 and 12 are diagrams each showing an example of the home screen of the application according to this embodiment. As shown in FIGS. 11 and 12, an avatar AV imitating the autonomous operation body 10 owned by the user is displayed on the home screen according to this embodiment.

The application control unit 250 may cause the screen to display the avatar AV that is a 3D model imitating the exterior, the voice (barking), and the like of the autonomous operation body 10 owned by the user, for example. Here, the exterior described above includes colors such as the eyeballs (pupils, irises, and the like) and the body color of the autonomous operation body 10, for example.

The application control unit 250 according to this embodiment may also control the output expression relating to the avatar AV, on the basis of the state of the autonomous operation body 10. The output expression described above may include an operation display, a color expression, an audio output, and the like. The application control unit 250 can cause the operation display of the avatar AV to reflect the action being performed by the autonomous operation body 10, for example.

For example, in the example case illustrated in FIG. 11, the application control unit 250 can cause the screen to display the avatar AV lying down, on the basis of the fact that the autonomous operation body 10 is lying down. Also, in the example case illustrated in FIG. 12, the application control unit 250 can cause the screen to display the avatar AV being charged on a charging station CS, for example, on the basis of the fact that the autonomous operation body 10 doing the same.

In addition to the above examples, the application control unit 250 can cause the avatar AV in the application to reflect various kinds of operations such as sitting, walking, and lying flat, which are performed by the autonomous operation body 10.

The application control unit 250 according to this embodiment may also cause the output expression of the avatar to reflect an emotion of the autonomous operation body 10. In the example cases illustrated in FIGS. 11 and 12, the application control unit 250 sets the color of the background BG on the home screen, on the basis of the current emotion of the autonomous operation body 10.

Figure 13:
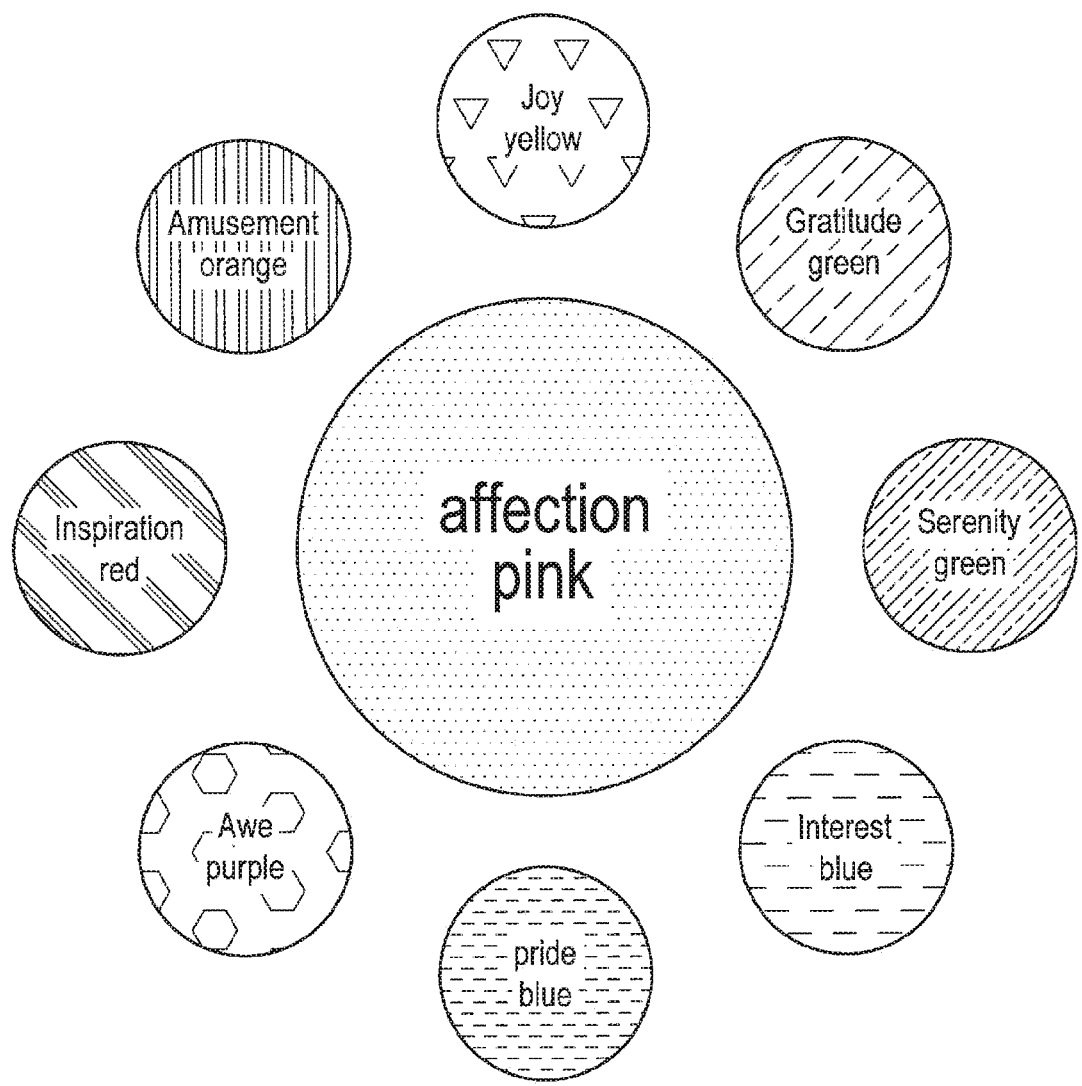
FIG. 13 is an example of colors representing emotions of an autonomous operation body according to the embodiment.

FIG. 13 is an example of colors representing emotions of the autonomous operation body 10 according to this embodiment. As shown in FIG. 13, emotions of the autonomous operation body 10 according to this embodiment may be expressed in various predetermined colors, such as pink for affection and yellow for joy, for example. Further, the intensity of each emotion may be expressed by shades of the color, for example. In a case where two or more emotions coexist, the emotions are expressed by gradation or the like of the two or more corresponding colors.

As described above, with the application control unit 250 according to this embodiment, it is possible to control not only operation of the autonomous operation body 10 but also the output expression of the avatar AV reflecting various states including emotions. With the above functions of the application control unit 250 according to this embodiment, the user can know the state of the autonomous operation body 10 even from outside the home, and can a feeling of being with the autonomous operation body 10 all the time.

Referring back to FIGS. 11 and 12, explanation of the screen configuration of the application is continued. As shown in FIGS. 11 and 12, buttons b11 through b13 may be displayed on the home screen of the application according to this embodiment.

Figure 14:
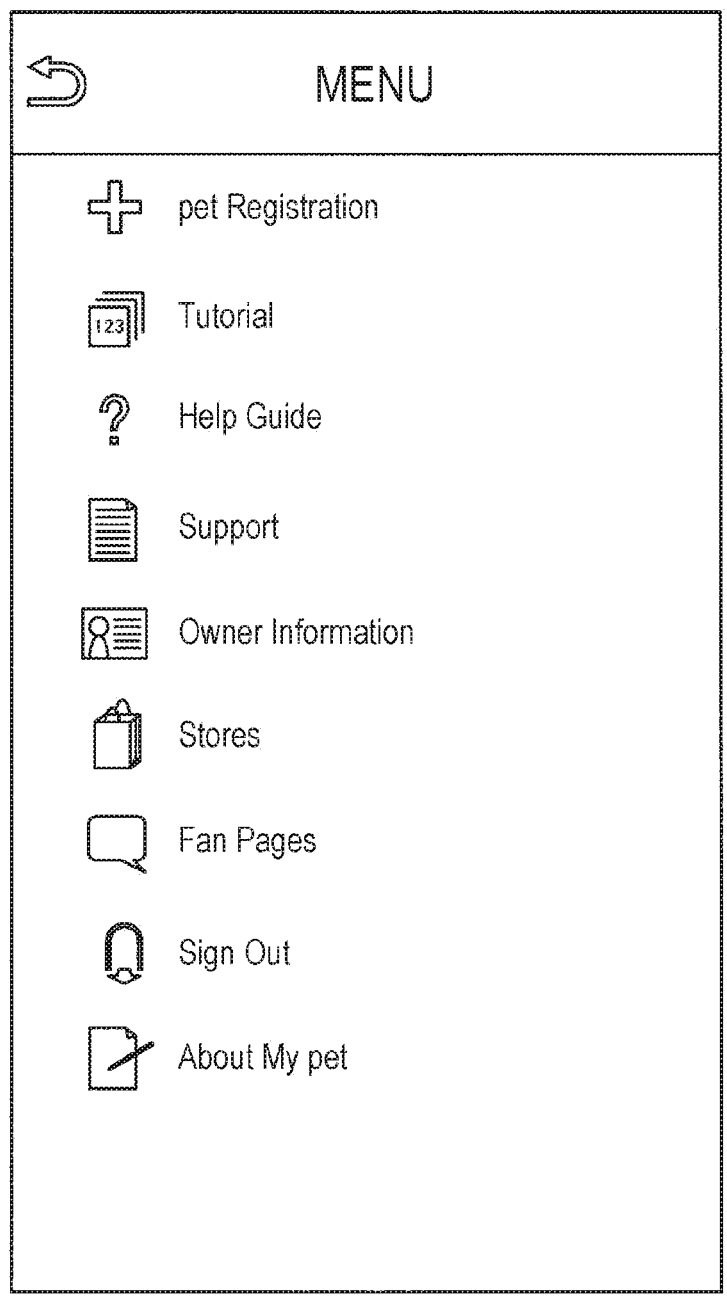
FIG. 14 is an example of an application menu screen according to the embodiment.

The button b11 may be a link to an application menu, for example. FIG. 14 is an example of an application menu screen according to this embodiment. As shown in FIG. 14, the application menu according to this embodiment includes pet (autonomous operation body 10) registration, tutorial, help guide, support, owner (user) information, stores, fan pages, sign out, and application overview information or the like.

The pet registration described above may be a function for linking the autonomous operation body 10 owned by the user to the application. The user can link the application to the autonomous operation body 10 by setting information about the user's autonomous operation body 10 through the pet registration. Note that the user can link a plurality of autonomous operation bodies 10 to the application. In this case, a plurality of avatars AV is displayed on the home screen, for example. The user selects a desired avatar AV, to use the functions linked to the corresponding autonomous operation body 10.

Meanwhile, the stores described above may include an online store from which an option related to a functional enhancement of the autonomous operation body 10 can be purchased. The user can enhance the functions of the autonomous operation body 10 by purchasing options for the exterior of the autonomous operation body 10, the voice (barking), new operations, and the like from the store, for example.

Further, the fan pages described above may include a site for users owning autonomous operation bodies 10 to communicate with one another. Through the fan page, the users may be able to exchange information related to the autonomous operation bodies 10, or exchange actions they have taught the autonomous operation bodies 10.

Figure 15:
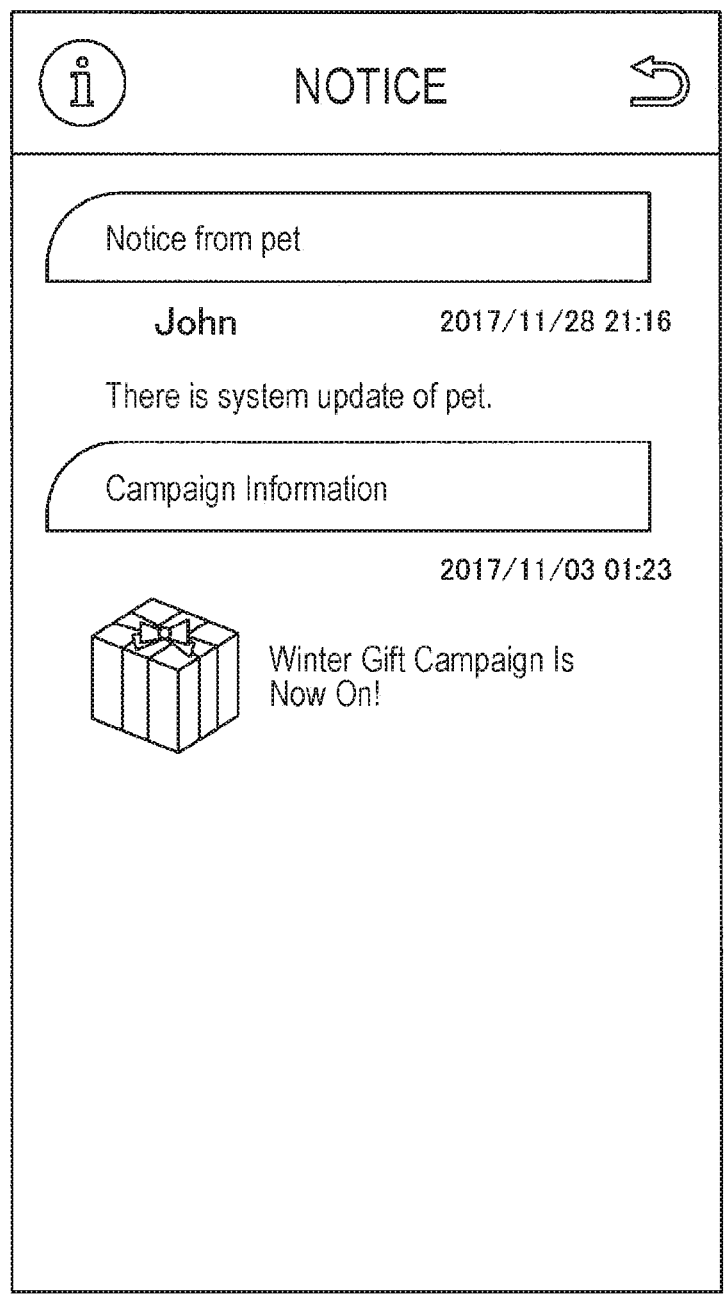
FIG. 15 is an example of a notification screen according to the embodiment.

Meanwhile, the button b12 on the home screen may be a link to a notification screen displaying notifications from the distributor of the autonomous operation body 10. FIG. 15 is an example of the notification screen according to this embodiment. As shown in FIG. 15, the notification screen displays information about a system update of the autonomous operation body 10, various kinds of campaign information, and the like, for example. The user may be able to obtain detailed information by tapping the respective pieces of displayed information or the like.

Figure 16:
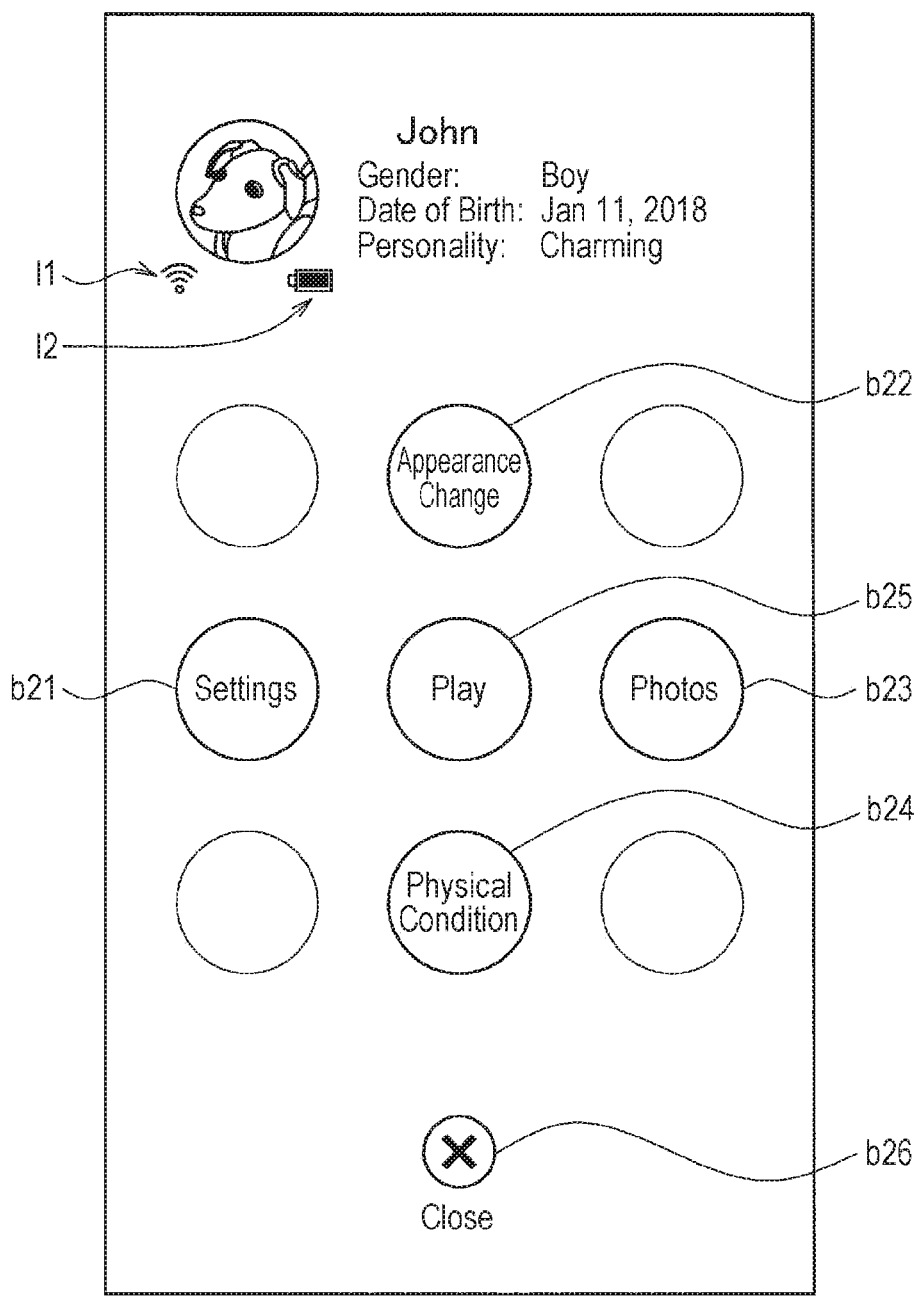
FIG. 16 is an example of a content list screen according to the embodiment.

Further, the button b13 on the home screen may be a link to a content list screen provided by the application. FIG. 16 is an example of the content list screen according to this embodiment. As shown in FIG. 16, the top of the content list screen according to this embodiment displays basic information such as the icon, the name, the gender, the date of birth, and the personality of the autonomous operation body 10.

As shown in the drawing, icons I1 and I2 indicating the network connection status and the remaining battery level of the autonomous operation body 10 may also be displayed on the content list screen. By visually checking the icons I1 and I2, the user can intuitively know the network connection status and the remaining battery level of the autonomous operation body 10.

Further, a plurality of buttons that is links to the content being provided by the application is displayed on the content list screen according to this embodiment. For example, a button b21 is a link to settings content, and a button b22 is a link to appearance change content. Further, a button b23 is a link to photo content, and a button b24 is a link to physical condition check content. Meanwhile, a button b25 is a link to game content according to this embodiment. Further, a button b26 is a link to the home screen.

Figure 17:
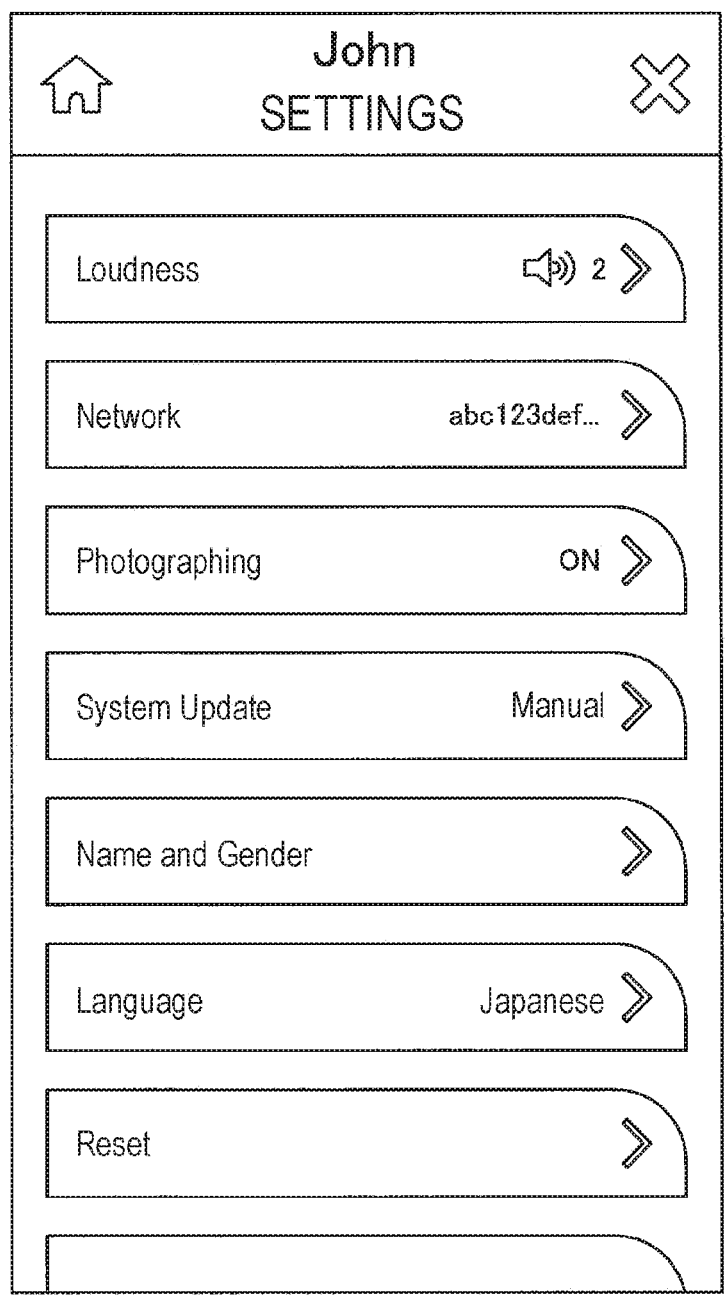
FIG. 17 is an example of a settings content screen according to the embodiment.

FIG. 17 is an example of a settings content screen according to this embodiment. As shown in FIG. 17, a volume of the voice (barking) of the autonomous operation body 10 can be set in the settings content according to this embodiment, for example. The user can change the volume of the voice of the autonomous operation body 10 or mute the autonomous operation body 10, according to the preference and the situation.

Network settings for the autonomous operation body 10 can also be made in the settings content according to this embodiment. On the screen, the user sets the information about the Wi-Fi or the like to which the autonomous operation body 10 is to be connected.

Further, whether or not to allow the autonomous operation body 10 to take photographs can be set in the settings content according to this embodiment. The autonomous operation body 10 according to this embodiment is capable of automatically taking a photograph of a person, an object, or the like the autonomous operation body 10 is interest in, or taking a photograph in accordance with an instruction from the user. On the screen, the user can set whether or not to allow the autonomous operation body 10 to perform the photographing as described above.

Settings relating to a system update can also be made in the settings content according to this embodiment. The user can set whether to perform the system update automatically or manually, for example.

The name and the gender of the autonomous operation body 10 can also be set in the settings content according to this embodiment. The autonomous operation body 10 can sense the user calling to itself and the like, by performing voice recognition of the set name. Meanwhile, the gender affects marking behaviors and the like the autonomous operation body 10 may perform, for example.

The language and the like to be used by the autonomous operation body 10 in voice recognition can also be set in the settings content according to this embodiment. The autonomous operation body 10 may select a dictionary to be used for voice recognition, depending on the set language.

Initialization of the autonomous operation body 10 and the like can also be performed in the settings content according to this embodiment.

Figure 18:
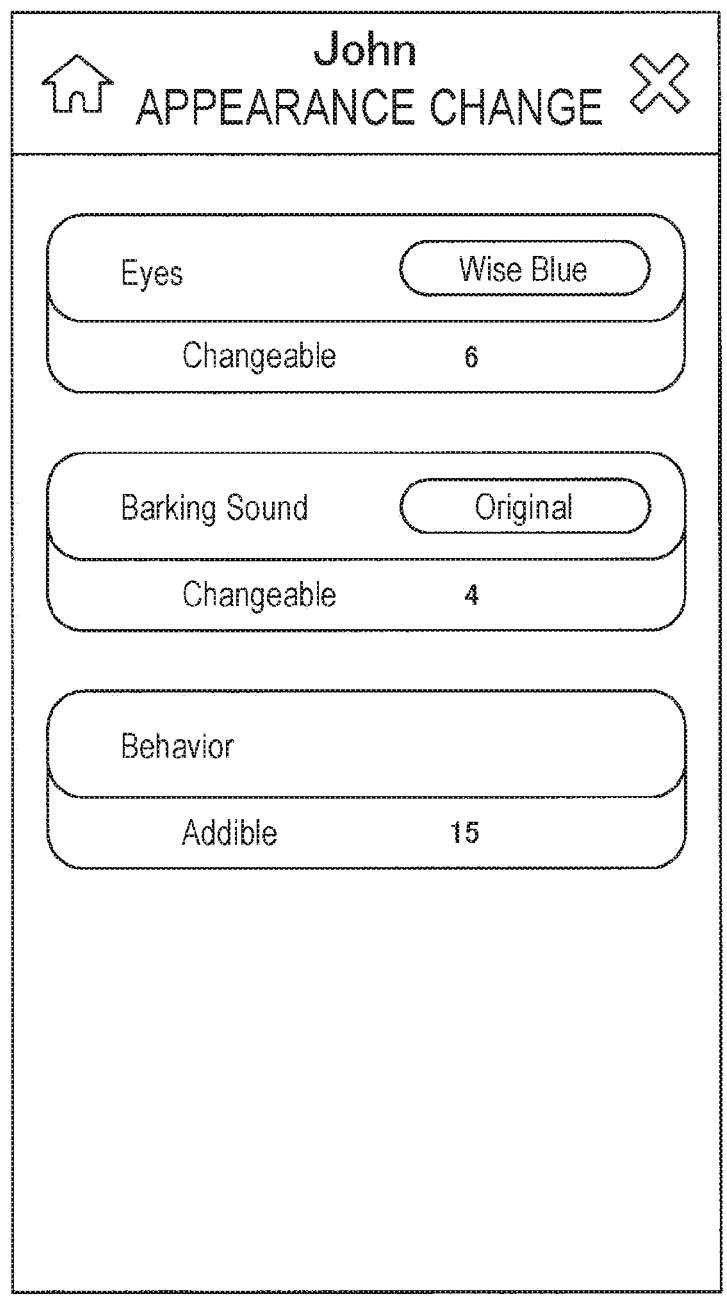
FIG. 18 is an example of an appearance change content screen according to the embodiment.

Next, the appearance change content according to this embodiment is described. FIG. 18 is an example of an appearance change content screen according to this embodiment. As shown in FIG. 18, a change in the settings related to the exterior or the voice (barking) of the autonomous operation body 10 may be made in the appearance change content according to this embodiment. Here, the exterior described above may include color expressions related to the eyeballs, such as the pupils or the irises, for example. The user can select a color expression or a barking voice for the autonomous operation body 10 from among the variations that can be set, and causes the autonomous operation body 10 to reflect the selected color expression or barking voice.

A pattern of autonomous operations that may be performed by the autonomous operation body 10 can also be newly added in the appearance change content according to this embodiment, and the like. Variations that can be set and new operations that can be added in the appearance change content increase with purchases at the store, present distributions, reward acquisition described later, and the like, for example.

Figure 19:
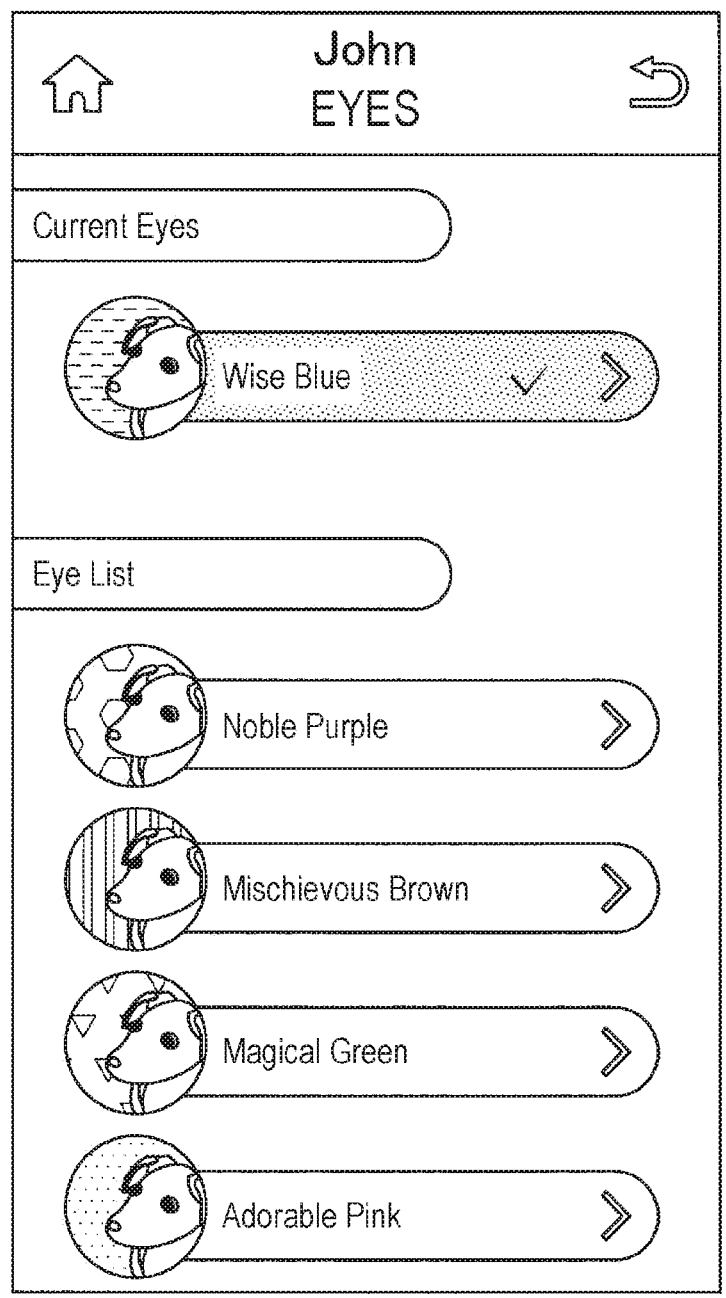
FIG. 19 is an example of an appearance change screen for color expressions of the eyeballs according to the embodiment.

FIG. 19 is an example of an appearance change screen for color expressions of the eyeballs according to this embodiment. On the screen, the settings of color expressions of the current eyeballs (the pupils, the irises, and the like) of the autonomous operation body 10, and the variations of the color expressions that can be changed may be displayed as a list, as shown in the drawing.

The user can check the displayed list of variations, and select a desired color, to change color expressions of the eyeballs of the autonomous operation body 10. At this stage, the reflection unit 260 causes the autonomous operation body 10 to reflect the selected color expression, on the basis of the user's operation.

Figure 20:
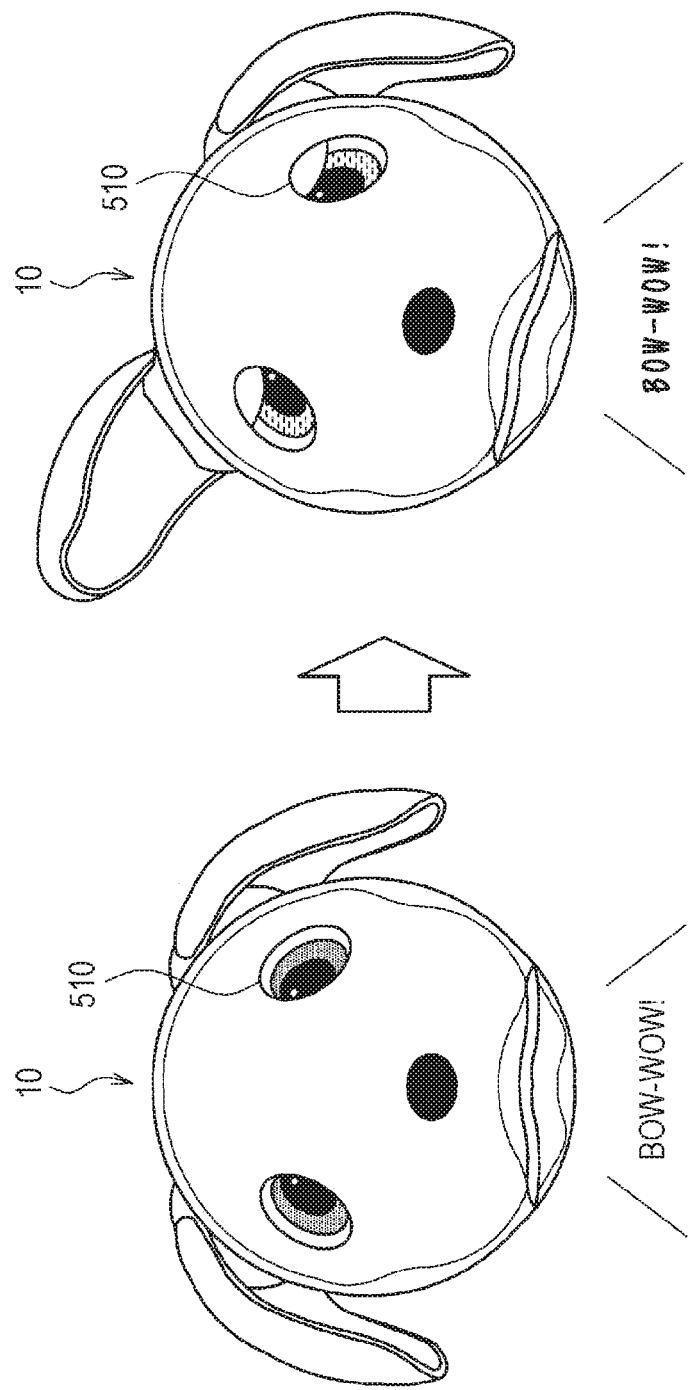
FIG. 20 is a diagram for explaining reflection of settings caused by a reflection unit according to the embodiment.

FIG. 20 is a diagram for explaining reflection of settings caused by the reflection unit 260 according to this embodiment. The left side in FIG. 20 shows the head of the autonomous operation body 10 before the user makes an appearance change setting, and the right side in FIG. 20 shows the head of the autonomous operation body 10 after the user performs the appearance change setting.

Here, as can be seen from a comparison between the right and left images, the color expression of the eyeballs displayed on the displays 510 and the barking voice have been changed by the user making appearance change settings. After the appearance change settings, a new operation of tilting the head and lifting up one ear has also been added. In such a manner, the reflection unit 260 according to this embodiment can cause the autonomous operation body 10 to reflect the corresponding exterior, voice, and new operation, on the basis of the appearance change settings made by the user. The application control unit 250 may also cause the output expression of the avatar AV to reflect the appearance change settings as described above.

In this manner, with the application according to this embodiment, the user can easily change the exterior and the voice of the autonomous operation body 10, and add a new operation, according to the preference, the mood, and the like. Thus, the autonomous operation body 10 that keeps changing is obtained, and an effect to maintain the user's interest in the autonomous operation body 10 without boring the user can be expected.

Next, the photo content according to this embodiment is described. FIG. 21 is an example of a photo content screen according to this embodiment. As described above, the autonomous operation body 10 according to this embodiment can autonomously take a photograph depending on its own interest, or take a photograph in accordance with an instruction from the user. In the photo content according to this embodiment, the images captured by the autonomous operation body 10 as described above can be checked.

As shown on the left side in FIG. 21, the photo content screen according to this embodiment may display a list of images captured by the autonomous operation body 10 in chronological order or the like. Further, the user can select a desired photograph, so that the screen switches to a details screen of the photograph, as shown on the right side in FIG. 21.

The details screen of the photograph displays basic information such as the photographing date, in addition to an enlarged image of the photograph. Note that an image captured autonomously by the autonomous operation body 10 may be associated with the emotion of the autonomous operation body 10 at the time of the image capturing and the like, and be then displayed. The user can also tap each button shown on the details screen or the like, to delete the photograph, share the photograph on a fan page or in another application, download the photograph, or the like.

Note that, in FIG. 21, images captured by the autonomous operation body 10 are shown like images captured with a lens having a general angle of view. However, the camera included in the autonomous operation body 10 according to this embodiment is a wide-angle camera, and accordingly, an image captured by the autonomous operation body 10 in practice is an image having a wide angle of view and distortion.

The user can also download an image having distortion as described above without any change, or can correct the distortion of the image and process the image as a panoramic image (corresponding to a movable photograph in FIG. 21) before downloading the photograph.

As described above, with the application according to this embodiment, the user can easily refer to the images captured by the autonomous operation body 10, and it is possible for the user to know internal information, such as what the autonomous operation body 10 was interested in when taking the photograph.

Figure 22:
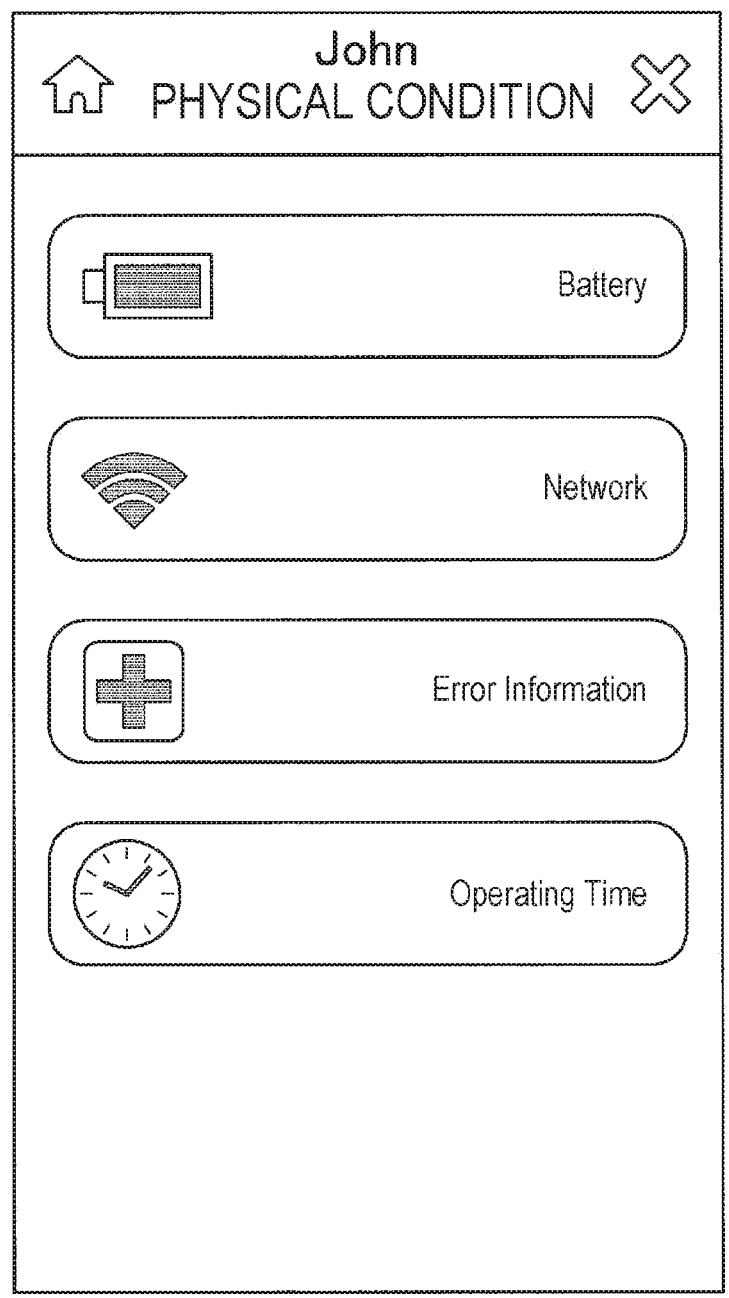
FIG. 22 is an example of a physical condition check content screen according to the embodiment.

Next, the physical condition check content according to this embodiment is described. FIG. 22 is an example of a physical condition check content screen according to this embodiment. The physical condition check content according to this embodiment is content for checking the operating condition of the autonomous operation body 10.

As shown in FIG. 22, the battery condition, the network condition, error information, the operating time, and the like can be checked in the physical condition check content according to this embodiment, for example. The battery condition described above may include, for example, details of the remaining battery level, the time required for a full charge, information about the specifics of battery deterioration and replacement, and the like.

Meanwhile, the network condition described above may include detailed information about the Wi-Fi to which the autonomous operation body 10 is connected, and the communication history or the like.

Further, the error information described above may include various kinds of error information and log information related to the components included in the autonomous operation body 10 such as the actuators 570, for example.

Also, the operation time described above may include the total operating time of the autonomous operation body 10, and the history of the operating times of the respective days or the like.

Further, although not shown in the drawing, transitions of emotions of the autonomous operation body 10, changes in the affection toward the user, and the like may be checked in the physical condition check content according to this embodiment.

As described above, with the physical condition check content according to this embodiment, the user can easily check the internal information about the autonomous operation body 10. This function is very effective for a device that does not have any communication means using a language, like the autonomous operation body 10 according to this embodiment.

Figure 23:
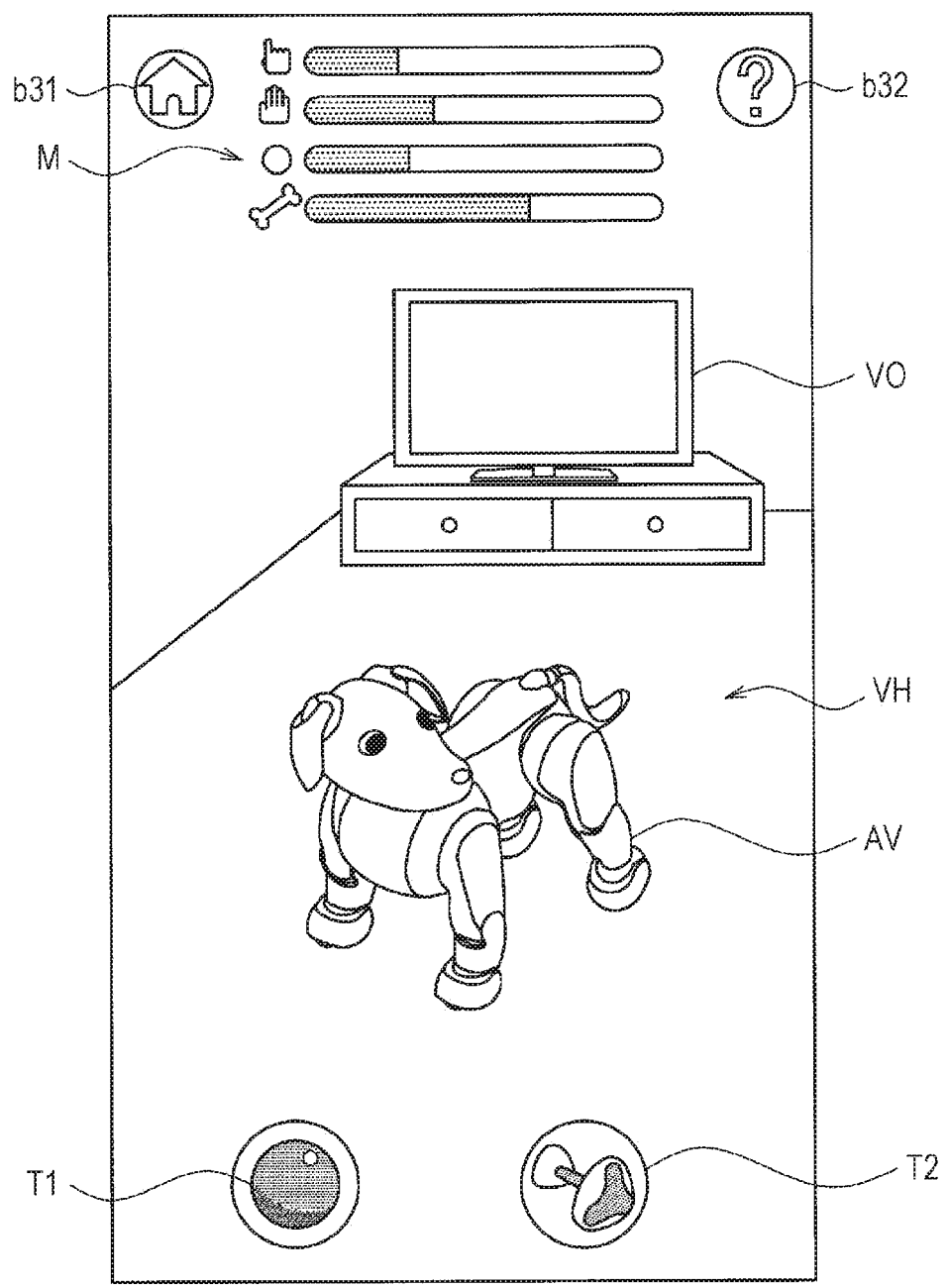
FIG. 23 is an example of a game content screen according to the embodiment.

Next, the game content according to this embodiment is described. As described above, in the game content according to this embodiment, the user can perform various kinds of communication with the avatar AV imitating the autonomous operation body 10, and obtain a reward corresponding to the communication. FIG. 23 is an example of a game content screen according to this embodiment.

As shown in FIG. 23, in the game content according to this embodiment, the avatar AV imitating the autonomous operation body 10 is displayed, as on the home screen. The application control unit 250 causes the screen to display the avatar AV reflecting the exterior, the voice, and the like of the autonomous operation body 10 in a virtual living room VH in which virtual objects VO such as furniture are displayed, for example. Note that, in a case where the user does not perform any operation, the application control unit 250 may control the output expression of the avatar AV linked with actual movements of the autonomous operation body 10, or may cause the avatar AV to perform a motion selected from among patterns such as standing on four feet, sitting down, lying down, and walking.

Figure 24:
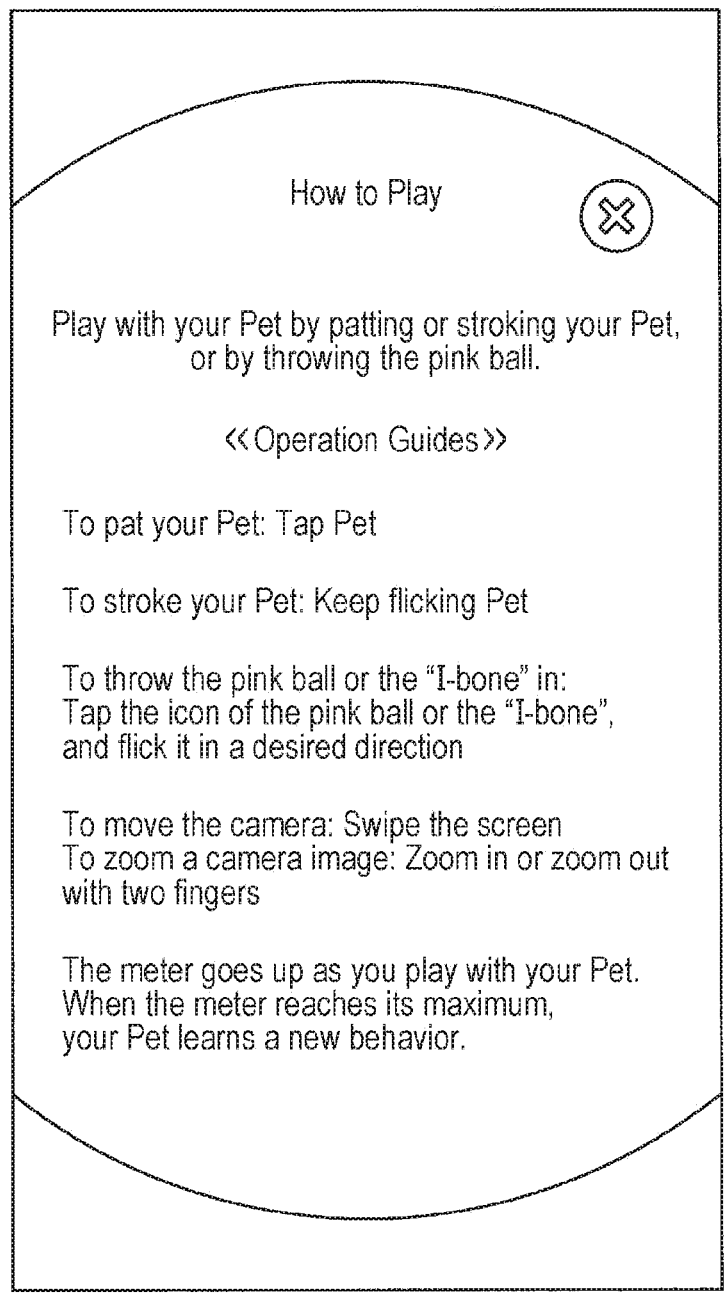
FIG. 24 is an example of a game content explanation screen according to the embodiment.

Further, a button b31 for returning to the home screen, a button b32 that is a link to an explanation screen for explaining how to play the game content, and the like are displayed on the game content screen according to this embodiment. FIG. 24 is an example of a game content explanation screen according to this embodiment. As shown in FIG. 24, the user can deepen communication with the avatar AV by performing operations such as touching, stroking, or throwing a ball or a bone-shaped toy, for the displayed avatar AV.

As shown FIG. 23, a lower portion of the game content screen displays virtual objects corresponding to a ball-shaped toy T1 and a bone-shaped toy T2, and an upper portion of the screen displays meters M corresponding to various kinds of communication, such as touching, stroking, and playing using the ball-shaped toy T1 or the bone-shaped toy T2. The meters M indicate the intensities corresponding to communication types, and become higher with the number of tapping (touching) operations performed by the user, or the like, for example. Here, in a case where a meter M reaches the upper limit, the application control unit 250 gives a reward corresponding to the communication type, and the reflection unit 260 causes the autonomous operation body 10 to reflect the contents of the reward.

The application control unit 250 according to this embodiment may also cause the avatar AV to perform various kinds of reactions corresponding to user operations. For example, in a case where a touching (tapping) operation is performed, the application control unit 250 may cause the avatar AV to perform an action, such as barking, wagging the tail, curling the back, scratching the head, giving high five, or begging.

Further, in a case where a stroking (flicking) operation is performed, the application control unit 250 may cause the avatar AV to perform an action, such as raising the head and shaking the body, kissing, and turning over (showing the belly).

Figure 25:
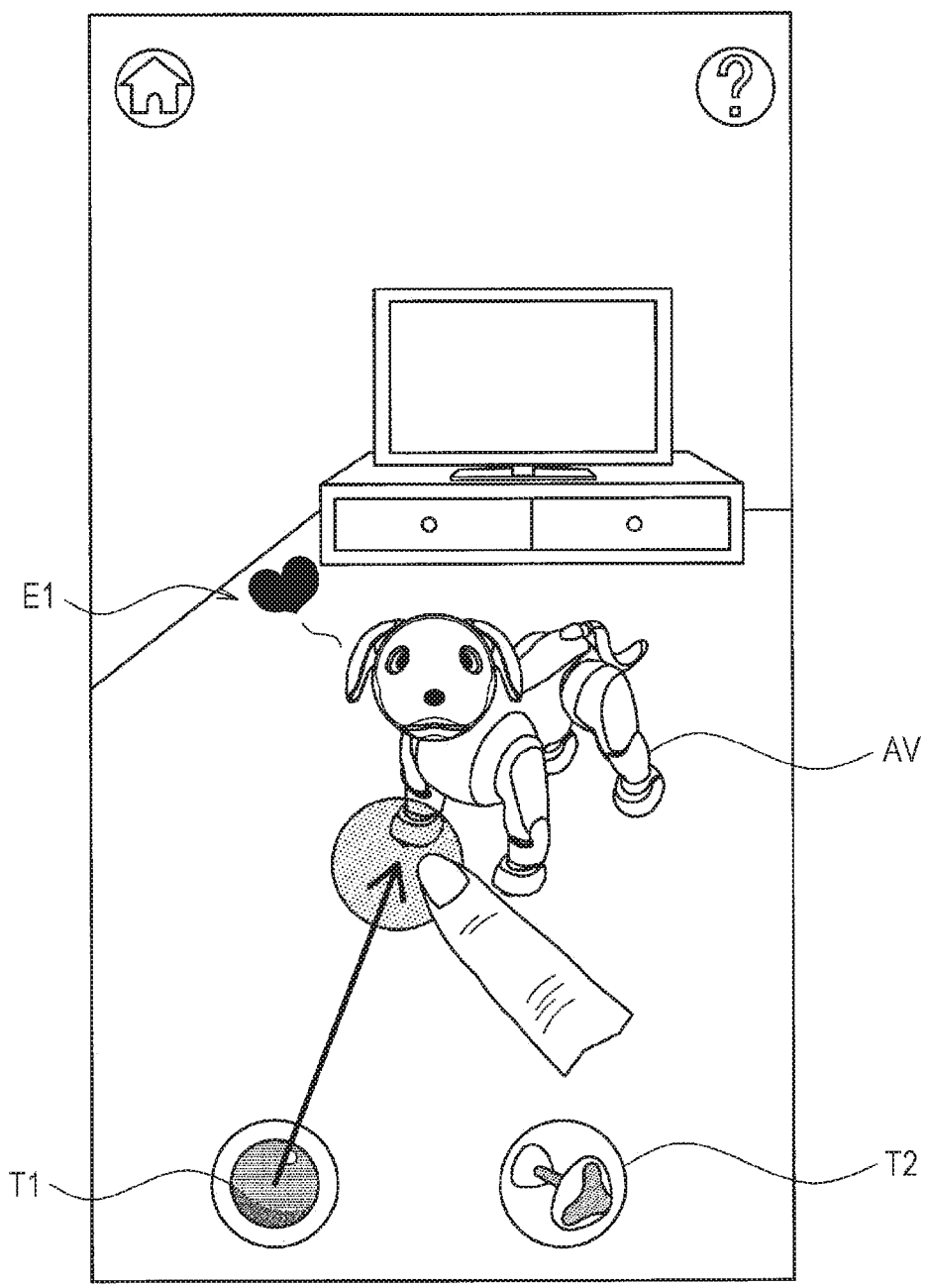
FIG. 25 is a diagram for explaining an interaction between an autonomous operation body and a user via a ball-shaped toy according to the embodiment.

The same applies to playing using a virtual object such as the ball-shaped toy T1 or the bone-shaped toy T2. FIG. 25 is a diagram for explaining an interaction between the autonomous operation body 10 and the user via the ball-shaped toy T1 according to this embodiment.

As shown in FIG. 25, in the game content according to this embodiment, the user can throw the ball-shaped toy T1 toward the avatar AV by flicking the ball-shaped toy T1 displayed at the lower portion of the screen.

At this stage, the application control unit 250 controls the operation display of the ball-shaped toy T1 in accordance with the laws of physics, for example, and causes the avatar AV to react to the ball-shaped toy T1. The application control unit 250 may cause the avatar AV to perform an action, such as smelling, pushing the ball-shaped toy T1 in the rightward or leftward direction or forward with the nose tip, putting one forefoot on the ball-shaped toy T1, holding down the ball-shaped toy T1 with both forefeet and biting on it, or kicking the ball-shaped toy T1 in the rightward or leftward direction or forward, for example. The application control unit 250 according to this embodiment may also cause the screen to display an effect E1 related to an emotional expression as one reaction, as shown in FIG. 25.

Figure 26:
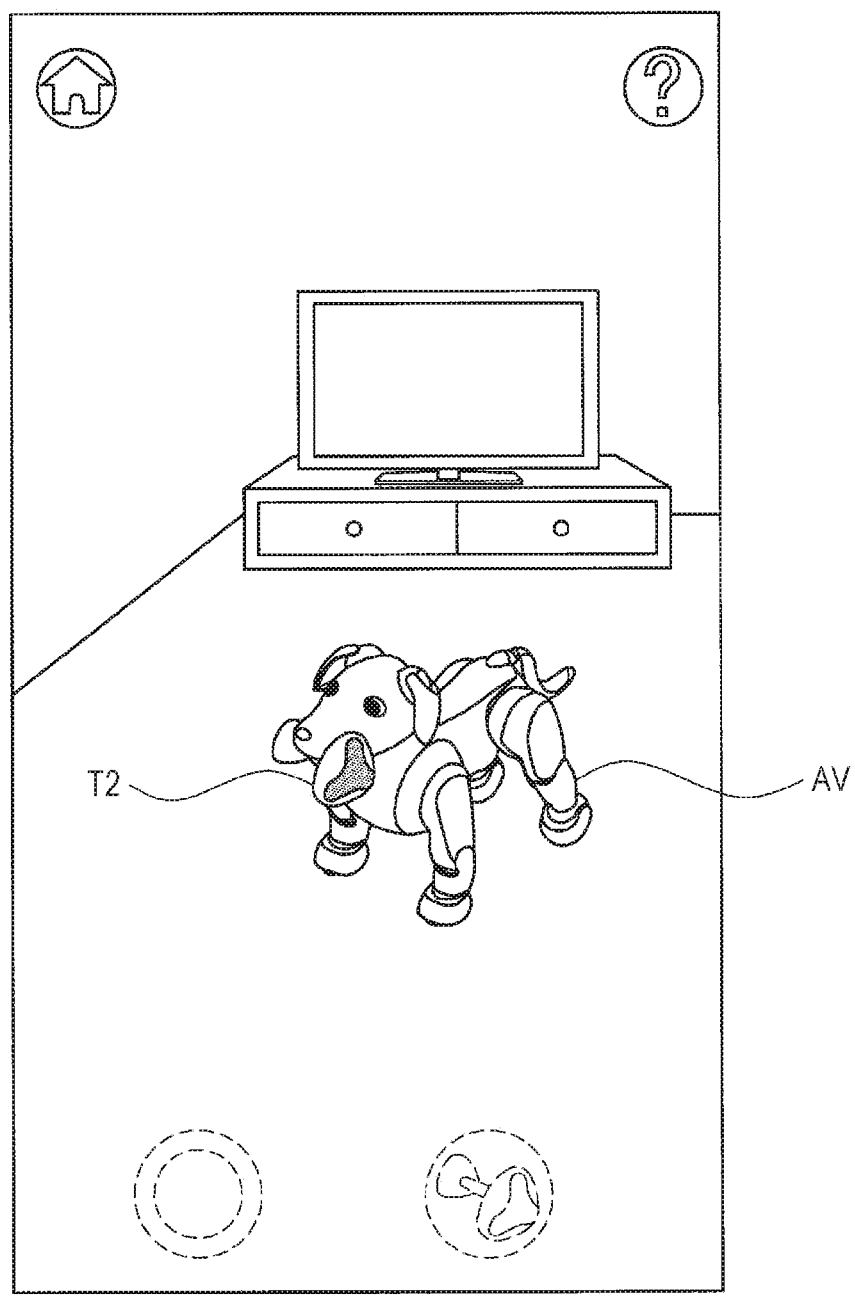
FIG. 26 is a diagram for explaining an interaction between an autonomous operation body and a user via a bone-shaped toy according to the embodiment.

Further, FIG. 26 is a diagram for explaining an interaction between the autonomous operation body 10 and the user via the bone-shaped toy T2 according to this embodiment. As with the ball-shaped toy T1, the user can throw the bone-shaped toy T2 toward the avatar AV by flicking the bone-shaped toy T2 displayed at the lower portion of the screen.

At this stage, the application control unit 250 controls the operation display of the bone-shaped toy T2 in accordance with the laws of physics, for example, and causes the avatar AV to react to the bone-shaped toy T2.

The application control unit 250 may cause the avatar AV to perform an action, such as sniffling the bone-shaped toy T2, pushing the bone-shaped toy T2 in the rightward or leftward direction or forward with the noise tip, standing the bone-shaped toy T2, knocking down the bone-shaped toy T2, holding the bone-shaped toy T2 in the mouth, shaking the bone-shaped toy T2 while holding it in the mouth, or lifting up and down the bone-shaped toy T2, for example.

As described above, in the game content according to this embodiment, the user can perform various kinds of communication with the avatar AV imitating the autonomous operation body 10. Further, as described above, in a case where the intensity of one of the various kinds of communication (the number of times an operation has been performed by the user, or the number of times the avatar AV has performed a reaction, for example) has reached a predetermined value, the application control unit 250 may give a reward corresponding to the communication type.

Figure 27:
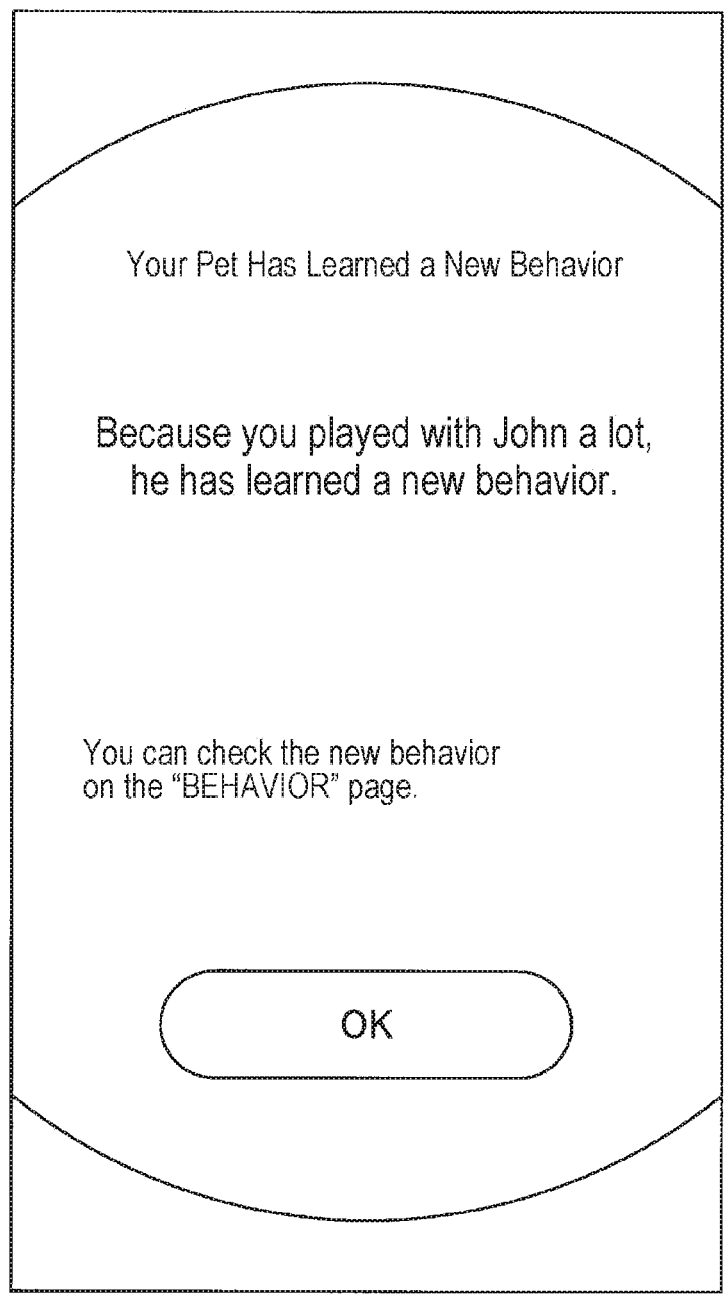
FIG. 27 is an example of a reward acquisition pop-up according to the embodiment.

FIG. 27 is an example of a reward acquisition pop-up according to this embodiment. In a case where the intensity of one of the various kinds of communication has reached a predetermined value because of an operation performed by the user, which is a case where the meter M has reached its maximum, the application control unit 250 causes the game content to display a pop-up screen therein, as shown in FIG. 27. In the example case illustrated in FIG. 27, the application control unit 250 gives a new behavior, which is a new operation the autonomous operation body 10 can perform, as a reward, and causes the screen to display a notification to the effect that the reward has been acquired.

As described above, the reward according to this embodiment may be a reward related to a functional enhancement of the autonomous operation body 10, for example. The functional enhancement described above may be an addition of a new operation the autonomous operation body 10 can perform as shown in FIG. 27, but may be an addition of a variation of the exterior such as a color expression for the eyeballs, an addition of a variation of the voice (barking) of the autonomous operation body 10, or the like.

Further, the application control unit 250 according to this embodiment may cause the screen to display a pop-up screen as shown in FIG. 27, and cause the output expression of the avatar AV to reflect a given reward. The application control unit 250 may cause the avatar AV to perform a new operation given as the reward, or may cause the output expression of the avatar AV to reflect a new variation of the exterior or the voice given as the reward. With the above functions of the application control unit 250 according to this embodiment, the user can visually recognize a newly acquired reward each time, and make an appearance change setting according to the user's preference.

Meanwhile, the reflection unit 260 according to this embodiment causes the autonomous operation body 10 to reflect a newly acquired reward, which is an addition of a new operation or an addition of a variation of the exterior or the voice. In a case where a reward is a new operation, the reflection unit 260 according to this embodiment also transmits the control sequence data for causing the autonomous operation body 10 to perform the new operation, to the autonomous operation body 10 via the terminal communication unit 270.

As described above, with the game content according to this embodiment, the user can communicate with the avatar AV imitating the autonomous operation body 10 even from outside the home, to obtain a reward relating to a functional enhancement and cause the autonomous operation body 10 to reflect the reward.

The above is a description of an example of the game content according to this embodiment. Note that the above description is merely an example, and the game content according to this embodiment is not limited to this example.

For example, a user operation is not necessarily an input operation performed on the input unit 310 by the user. A user operation according to this embodiment may be a voice input, for example. In other words, the user may be able to communicate with the avatar AV by voice.

Further, in the above description, the application control unit 250 causes the avatar AV to perform various kinds of operations corresponding to operations performed by the user. However, such an operation may be an unacquired operation the autonomous operation body 10 is still unable to perform. In this case, the application control unit 250 according to this embodiment counts the number of times the avatar AV has performed each unacquired operation and the like. In a case where the number of times exceeds a threshold, the application control unit 250 may give the unacquired operation as a reward.

Further, the application control unit 250 according to this embodiment may select a reward according to a feedback from the user. For example, the application control unit 250 may cause the avatar AV to randomly perform a plurality of unacquired operations, and select an unacquired operation to which the user has showed a good reaction, as a reward. Note that a reaction of the user may be analyzed on the basis of an utterance of the user detected by the input unit 310, a face image of the user, or the like, for example.

The user may also be able to cause the avatar AV and the autonomous operation body 10 to perform learning related to recognition of a new object, via the input unit 310. For example, the user utters the name or the like corresponding to an object while showing the object to the avatar AV via an imaging device included in the input unit 310. At this stage, the information processing server 20 may associate an image of the object with a voice recognition result, and additional register the image in an object recognition dictionary included in the autonomous operation body 10. With the information processing server 20 according to this embodiment, it is possible to perform continuous communication, so that, after the user has returned home, the autonomous operation body 10 remembers the content the user taught to the avatar AV from outside the home, for example.

Further, in the above described example case, the application control unit 250 causes a display device or the like included in the information processing terminal 30 to display a user interface. However, display control according to this embodiment is not limited to this example. The application control unit 250 according to this embodiment can also perform display control on the avatar AV by an augmented reality (AR) technology, a virtual reality (VR) technology, a mixed reality (MR) technology, or the like, for example.

2.3. Control Flow

Figure 28:
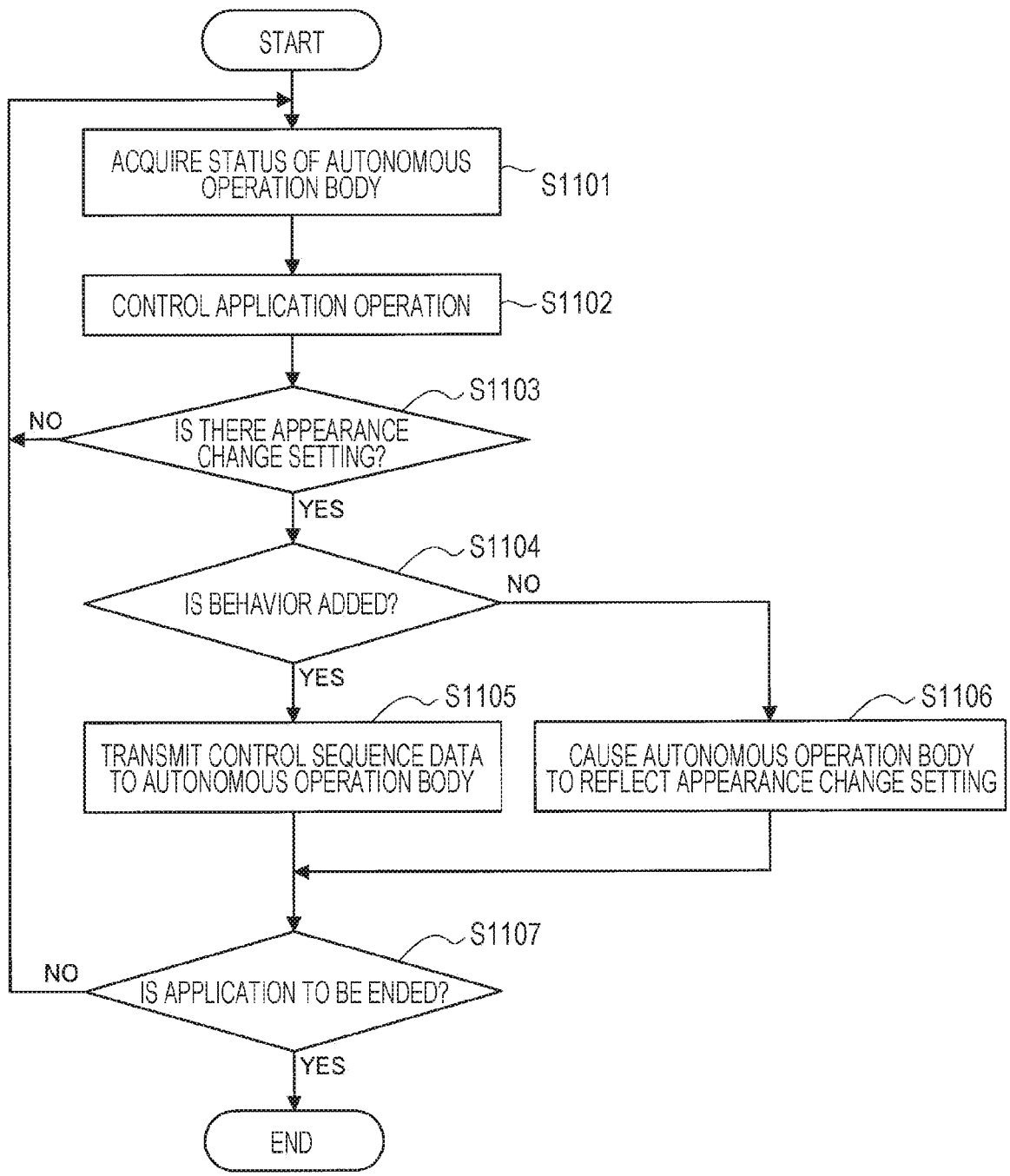
FIG. 28 is a flowchart showing the flow in appearance change settings control to be performed by an information processing server according to the embodiment.

Next, the flow in control to be performed by the information processing server according to this embodiment is described in detail. First, the flow in appearance change settings control to be performed by the information processing server 20 according to this embodiment is described. FIG. 28 is a flowchart showing the flow in appearance change settings control to be performed by the information processing server 20 according to this embodiment.

As shown in FIG. 28, first, the terminal communication unit 270 acquires information about the state of the autonomous operation body 10 (S1101).

The application control unit 250 then continuously performs operation control on the application, including control on the output expression of the avatar, depending on the state acquired in step S1101 (S1102).

Here, if an appearance change setting is made by the user (S1103: YES), the reflection unit 260 performs a process of causing the autonomous operation body 10 to reflect the selected setting.

Here, if the appearance change setting is addition of a behavior, which is a new operation (S1104: YES), the reflection unit 260 transmits control sequence data for causing the autonomous operation body 10 to perform the new operation, to the autonomous operation body 10 via the terminal communication unit 270 (S1105).

If the appearance change setting is a setting related to the exterior or a voice variation (S1104: NO), on the other hand, the reflection unit 260 causes the autonomous operation body 10 to reflect the selected setting (S1106).

The information processing server 20 repeatedly performs the process starting from step S1101, until an application end operation is performed (S1107: YES).

Figure 29:
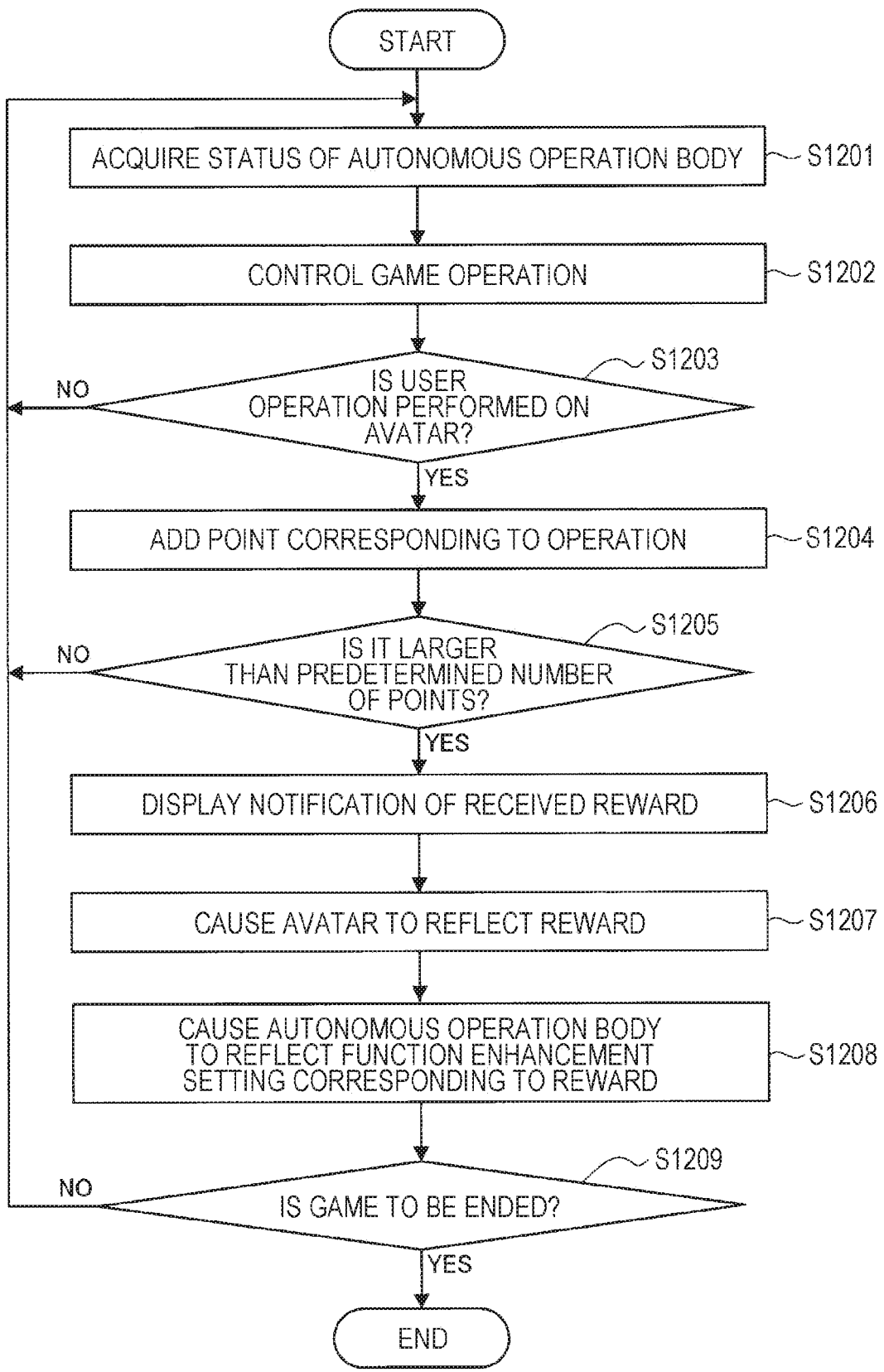
FIG. 29 is a flowchart showing the flow in game content control to be performed by the information processing server according to the embodiment.

Next, the flow in game content control according to this embodiment is described in detail. FIG. 29 is a flowchart showing the flow in game content control to be performed by the information processing server 20 according to this embodiment.

As shown in FIG. 20, first, the terminal communication unit 270 acquires information about the state of the autonomous operation body 10 (S1201).

The application control unit 250 then continuously performs operation control on the game content, on the basis of the information acquired in step S1201 (S1202).

Here, if an operation is performed on the avatar by the user (S1203: YES), the application control unit 250 adds a point to the communication type corresponding to the operation (S1204).

Here, if the points described above exceed a predetermined value (S1205: YES), the application control unit 250 causes the screen to display a notification relating to reward acquisition depending on the communication type (S1206), and also causes the avatar to reflect the contents of the reward (S1207).

The reflection unit 260 also causes the autonomous operation body 10 to reflect the functional enhancement setting corresponding to the acquired reward (S1208).

The information processing server 20 repeatedly performs the process starting from step S1201, until a game content end operation is performed (S1209: YES).

3. Example Hardware Configuration

Next, an example hardware configuration common to the information processing server 20 and the information processing terminal 30 according to an embodiment of the present disclosure is described.

FIG. 30 is a block diagram showing an example hardware configuration example of the information processing server 20 and the information processing terminal 30 according to an embodiment of the present disclosure. As shown in FIG. 30, the information processing server 20 and the information processing terminal 30 include a CPU 871, a ROM 872, a RAM 873, a host bus 874, a bridge 875, an external bus 876, an interface 877, an input device 878, an output device 879, a storage 880, a drive 881, a connecting port 882, and a communication device 883, for example. Note that the hardware configuration shown herein is an example, and some of the components may be omitted. Further, components other than the components shown herein may be further included.

CPU 871

The CPU 871 functions as an arithmetic processing unit or a control device, for example, and controls the overall operation of each component or part thereof, on the basis of various kinds of programs recorded in the ROM 872, the RAM 873, the storage 880, or a removable recording medium 901.

ROM 872 and RAM 873

The ROM 872 is a means for storing programs to be read by the CPU 871, data to be used for calculation, and the like. The RAM 873 temporarily or permanently stores programs to be read by the CPU 871, various kinds of parameters that change as appropriate when the programs are executed, and the like, for example.

Host Bus 874, Bridge 875, External Bus 876, and Interface 877

The CPU 871, the ROM 872, and the RAM 873 are connected to one another via the host bus 874 capable of high-speed data transmission, for example. Meanwhile, the host bus 874 is connected to the external bus 876 having a relatively low data transmission rate via the bridge 875, for example. The external bus 876 is further connected to various components via the interface 877.

Input Device 878

The input device 878 is formed with a mouse, a keyboard, a touch panel, a button, a switch, a lever, and the like, for example. Further, the input device 878 may be formed with a remote controller capable of transmitting a control signal using infrared rays or other radio waves. The input device 878 also includes a sound input device such as a microphone.

Output Device 879

The output device 879 is a display device such as a cathode ray tube (CRT), an LCD, or an organic EL, an audio output device such as a speaker or headphones, or a device capable of visually or audibly notifying the user of acquired information, such as a printer, a mobile phone, or a facsimile, for example. The output device 879 according to the present disclosure also includes any one of various vibration devices capable of outputting tactile stimulation.

Storage 880

The storage 880 is a device for storing various kinds of data. The storage 880 may be a magnetic storage device such as a hard disk drive (HDD), a semiconductor storage device, an optical storage device, a magnetooptical storage device, or the like, for example.

Drive 881

The drive 881 is a device that reads information recorded on the removable recording medium 901 such as a magnetic disk, an optical disk, a magnetooptical disk, or a semiconductor memory, or writes information on the removable recording medium 901, for example.

Removable Recording Medium 901

The removable recording medium 901 is a DVD medium, a Blu-ray (registered trademark) medium, an HD DVD medium, any one of various semiconductor storage media, or the like, for example. The removable recording medium 901 may of course be an IC card on which a noncontact IC chip is mounted, an electronic device, or the like, for example.

Connecting Port 882

The connecting port 882 is a port for connecting an external connection device 902, such as a universal serial bus (USB) port, an IEEE1394 port, a small computer system interface (SCSI), an RS-232C port, or an optical audio terminal, for example.

External Connection Device 902

The external connection device 902 is a printer, a portable music player, a digital camera, a digital video camera, an IC recorder, or the like, for example.

Communication Device 883

The communication device 883 is a communication device for connecting to a network, such as a wired or wireless LAN, Bluetooth (registered trademark), a communication card for a wireless USB (WUSB), a router for optical communication, a router for an asymmetric digital subscriber line (ADSL), a modem for any of various kinds of communication, or the like, for example.

4. Summary

As described above, the information processing server 20 according to an embodiment of the present disclosure includes: the application control unit 250 that controls operation of an application relating to communication between an autonomous operation body 10 and a user; and a reflection unit 260 that causes the autonomous operation body to reflect an operation performed by the user in the application. Further, one of the features of the application control unit 250 according to an embodiment of the present disclosure is to control operation of an avatar imitating the autonomous operation body 10, and the reflection unit 260 causes the autonomous operation body to reflect a reward obtained by the avatar in accordance with the user's operation. With such a configuration, communication between the autonomous operation body and the user can be made more active.

While preferred embodiments of the present disclosure have been described above with reference to the accompanying drawings, the technical scope of the present disclosure is not limited to these examples. It is apparent that those who have ordinary skills in the technical field of the present disclosure can make various changes or modifications within the scope of the technical spirit claimed herein, and it should be understood that those changes or modifications are within the technical scope of the present disclosure.

Furthermore, the effects disclosed in this specification are merely illustrative or exemplary, but are not restrictive. That is, the technology according to the present disclosure may achieve other effects obvious to those skilled in the art from the description in the present specification, in addition to or instead of the effects described above.

It is also possible to create a program for causing hardware such as a CPU, a ROM, and a RAM in a computer to have functions equivalent to those of the components of an autonomous operation body 10 and the information processing server 20, and provide computer-readable non-transitory recording medium storing the program.

Further, the respective steps relating to the processes to be performed by the autonomous operation bodies 10 and the information processing server 20 in the present disclosure are not necessarily carried out in chronological order according to the sequences shown in the flowcharts. For example, the respective steps relating to the processes to be performed by the autonomous operation bodies 10 and the information processing server 20 may be carried out in a different order from the sequences shown in the flowcharts, or may be carried out in parallel.

Note that the configurations described below are also within the technical scope of the present disclosure.

(1)

An information processing device including:

an application control unit that controls operation of an application relating to communication between an autonomous operation body and a user; and a reflection unit that causes the autonomous operation body to reflect an operation performed by the user in the application, in which the application control unit controls operation of an avatar imitating the autonomous operation body, and the reflection unit causes the autonomous operation body to reflect a reward obtained by the avatar on the basis of the operation performed by the user.

(2)

The information processing device according to (1), in which the reward includes a functional enhancement of the autonomous operation body.

(3)

The information processing device according to (2), in which the functional enhancement includes an addition of a new operation the autonomous operation body is able to perform.

(4)

The information processing device according to (3), in which the reflection unit causes transmission of control sequence data to the autonomous operation body, the control sequence data being for causing the autonomous operation body to perform the new operation.

(5)

The information processing device according to any one of (2) to (4), in which the functional enhancement includes an addition of a variation relating to an exterior of the autonomous operation body.

(6)

The information processing device according to (5), in which the variation relating to the exterior includes at least a color expression.

(7)

The information processing device according to any one of (2) to (6), in which the functional enhancement includes an addition of a variation relating to voice of the autonomous operation body.

(8)

The information processing device according to any one of (1) to (7), in which the application control unit controls an output expression relating to the avatar, on the basis of a state of the autonomous operation body.

(9)

The information processing device according to any one of (1) to (8), in which the application control unit causes an output expression of the avatar to reflect an operation being performed by the autonomous operation body.

(10)

The information processing device according to any one of (1) to (9), in which the application control unit causes an output expression of the avatar to reflect an emotion of the autonomous operation body.

(11)

The information processing device according to (9) or (10), in which the output expression includes at least one of an operation display, a color expression, or a voice output.

(12)

The information processing device according to any one of (1) to (11), in which the application control unit causes an output expression of the avatar to reflect the reward obtained by the avatar.

(13)

The information processing device according to any one of (1) to (12), in which the application control unit controls operation of game content relating to communication between the avatar and the user, and the application control unit gives the reward, on the basis of an intensity of communication with the user in the game.

(14)

The information processing device according to (13), in which the communication in the game includes contact with the avatar, or an interaction with the avatar via a virtual object.

(15)

An information processing method implemented by a processor, the information processing method including:

controlling operation of an application relating to communication between an autonomous operation body and a user; and causing the autonomous operation body to reflect an operation performed by the user in the application, in which the controlling further includes controlling operation of an avatar imitating the autonomous operation body, and the causing further includes causing the autonomous operation body to reflect a reward obtained by the avatar on the basis of the operation performed by the user.

(16)

A program for causing a computer to function as an information processing device that includes:

an application control unit that controls operation of an application relating to communication between an autonomous operation body and a user; and a reflection unit that causes the autonomous operation body to reflect an operation performed by the user in the application, in which the application control unit controls operation of an avatar imitating the autonomous operation body, and the reflection unit causes the autonomous operation body to reflect a reward obtained by the avatar on the basis of the operation performed by the user.

REFERENCE SIGNS LIST

10 Autonomous operation body
110 Input unit
120 Recognition unit
130 Learning unit
140 Action planning unit
150 Operation control unit
160 Drive unit
170 Output unit
510 Display
570 Actuator
20 Information processing server
210 Learning unit
220 Action recommendation unit
230 Analysis unit
240 Storage unit
250 Application control unit
260 Reflection unit
270 Terminal communication unit
30 Information processing terminal

The invention claimed is:

1. An information processing device, comprising:
a processor configured to:
control a screen to display an avatar;
control operation of an application, wherein the application is related to communication between an autonomous operation body and a user;
control the autonomous operation body to reflect a first operation performed by the user in the application;
control, based on the first operation performed by the user, a first operation of the avatar that imitates the autonomous operation body;
control the avatar to execute a second operation and a third operation;
detect user information based on the execution of the second operation and the third operation;
select, as a first reward, one of the second operation or the third operation based on the detected user information,
wherein the selected one of the second operation or the third operation includes a functional enhancement of the autonomous operation body;
output the first reward to the avatar;
control the autonomous operation body to reflect the first reward obtained by the avatar, wherein
the selected one of the second operation or the third operation is inexecutable by the autonomous operation body before the output of the first reward, and
the selected one of the second operation or the third operation is executable by the autonomous operation body after the output of the first reward;
control, based on a user operation on the screen, the avatar to execute a fourth operation;
control the screen to display an effect that indicates an emotional expression of the avatar as a reaction to the user operation;
control the screen to display a physical condition associated with the autonomous operation body, wherein
the physical condition includes error information, and
the error information includes at least a plurality of errors associated with a plurality of actuators included in the autonomous operation body; and
set a background of the screen as a gradation of two or more colors of a plurality of colors, based on co-existence of two or more emotions of the autonomous operation body, wherein
each color of the plurality of colors is associated with a different emotion, and
the two or more colors correspond to the two or more emotions of the autonomous operation body.

2. The information processing device according to claim 1, wherein
the processor is further configured to cause transmission of control sequence data to the autonomous operation body, and
the control sequence data is to cause the autonomous operation body to execute the selected one of the second operation or the third operation.

3. The information processing device according to claim 1, wherein
the processor is further configured to output a second reward to the avatar, and
the second reward corresponds to addition of a variation relating to an exterior of the autonomous operation body.

4. The information processing device according to claim 3, wherein the variation relating to the exterior includes a color expression.

5. The information processing device according to claim 1, wherein the functional enhancement further includes an addition of a variation relating to voice of the autonomous operation body.

6. The information processing device according to claim 1, wherein the processor is further configured to control, based on a state of the autonomous operation body, an output expression relating to the avatar.

7. The information processing device according to claim 1, wherein the processor is further configured to control an output expression of the avatar to reflect a fifth operation performed by the autonomous operation body.

8. The information processing device according to claim 1, wherein the processor is further configured to cause an output expression of the avatar to reflect an emotion of the autonomous operation body.

9. The information processing device according to claim 7, wherein the output expression includes at least one of an operation display, a color expression, or a voice output.

10. The information processing device according to claim 1, wherein the processor is further configured to cause an output expression of the avatar to reflect the first reward obtained by the avatar.

11. The information processing device according to claim 1, wherein the processor is further configured to control operation of game content relating to communication between the avatar and the user.

12. The information processing device according to claim 1, wherein communication between the avatar and the user includes at least one of contact with the avatar, or an interaction with the avatar via a virtual object.

13. The information processing device according to claim 1, wherein
the processor is further configured to output the first reward based on an intensity of communication between the user and the avatar being greater than a threshold, and
the intensity of the communication includes at least one of:
a number of times a specific operation is performed by the user in the application, or
a number of times the avatar has performed the reaction.

14. The information processing device according to claim 1, wherein the functional enhancement of the autonomous operation body includes a variation of a color expression of eyeballs of the autonomous operation body.

15. The information processing device according to claim 1, wherein the effect indicating the emotional expression of the avatar as the reaction to the user operation is displayed adjacent to the avatar.

16. The information processing device according to claim 1, wherein
the physical condition further includes an operating time associated with the autonomous operation body, and
the operating time includes a history of operating times of the autonomous operation body for specific days.

17. An information processing method, comprising:
controlling a screen to display an avatar;
controlling operation of an application, wherein the application is related to communication between an autonomous operation body and a user;
controlling the autonomous operation body to reflect a first operation performed by the user in the application;
controlling, based on the first operation performed by the user, a first operation of the avatar imitating the autonomous operation body;
controlling the avatar to execute a second operation and a third operation;
detecting user information based on the execution of the second operation and the third operation;
selecting, as a reward, one of the second operation or the third operation based on the detected user information, wherein the selected one of the second operation or the third operation includes a functional enhancement of the autonomous operation body;
outputting the reward to the avatar;
controlling the autonomous operation body to reflect the reward obtained by the avatar, wherein
the selected one of the second operation or the third operation is inexecutable by the autonomous operation body before the output of the reward, and
the selected one of the second operation or the third operation is executable by the autonomous operation body after the output of the reward;
controlling, based on a user operation on the screen, the avatar to execute a fourth operation;
controlling the screen to display an effect that indicates an emotional expression of the avatar as a reaction to the user operation;
controlling the screen to display a physical condition associated with the autonomous operation body, wherein
the physical condition includes error information, and
the error information includes at least a plurality of errors associated with a plurality of actuators included in the autonomous operation body; and
setting a background of the screen as a gradation of two or more colors of a plurality of colors, based on co-existence of two or more emotions of the autonomous operation body, wherein
each color of the plurality of colors is associated with a different emotion, and
the two or more colors correspond to the two or more emotions of the autonomous operation body.

18. A non-transitory computer-readable medium having stored thereon computer-executable instructions which, when executed by a processor, cause the processor to execute operations, the operations comprising:
controlling a screen to display an avatar;
controlling operation of an application, wherein the application is related to communication between an autonomous operation body and a user;
controlling the autonomous operation body to reflect a first operation performed by the user in the application;
controlling, based on the first operation performed by the user, a first operation of the avatar imitating the autonomous operation body;
controlling the avatar to execute a second operation and a third operation;
detecting user information based on the execution of the second operation and the third operation;
selecting, as a reward, one of the second operation or the third operation based on the detected user information, wherein the selected one of the second operation or the third operation includes a functional enhancement of the autonomous operation body;
outputting the reward to the avatar;
controlling the autonomous operation body to reflect the reward obtained by the avatar, wherein
the selected one of the second operation or the third operation is inexecutable by the autonomous operation body before the output of the reward, and
the selected one of the second operation or the third operation is executable by the autonomous operation body after the output of the reward;
controlling, based on a user operation on the screen, the avatar to execute a fourth operation;
controlling the screen to display an effect that indicates an emotional expression of the avatar as a reaction to the user operation;
controlling the screen to display a physical condition associated with the autonomous operation body, wherein
the physical condition includes error information, and
the error information includes at least a plurality of errors associated with a plurality of actuators included in the autonomous operation body; and
setting a background of the screen as a gradation of two or more colors of a plurality of colors, based on co-existence of two or more emotions of the autonomous operation body, wherein
each color of the plurality of colors is associated with a different emotion, and
the two or more colors correspond to the two or more emotions of the autonomous operation body.

* * * * *